United States Patent
Cho et al.

(10) Patent No.: US 9,365,690 B2
(45) Date of Patent: Jun. 14, 2016

(54) ARTICLE, METHOD OF PREPARING SAME, AND DISPLAY DEVICE INCLUDING THE SAME

(75) Inventors: Chung Kun Cho, Suwon-si (KR); Kovalev Mikhail, Suwon-si (KR); Yoon Seok Ko, Seoul (KR); Androsov Dmitry, Suwon-si (KR); Kalinina Fedosya, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 818 days.

(21) Appl. No.: 13/586,051

(22) Filed: Aug. 15, 2012

(65) Prior Publication Data

US 2013/0202869 A1    Aug. 8, 2013

(30) Foreign Application Priority Data

Feb. 7, 2012 (KR) .................. 10-2012-0012562

(51) Int. Cl.
*B32B 7/02* (2006.01)
*C08J 7/06* (2006.01)

(52) U.S. Cl.
CPC ............... *C08J 7/06* (2013.01); *C08J 2379/08* (2013.01); *Y10T 428/2982* (2015.01)

(58) Field of Classification Search
CPC .... C08J 2379/08; C08J 7/06; Y10T 428/2982
USPC ................................................. 428/212, 220
See application file for complete search history.

(56) References Cited

U.S. PATENT DOCUMENTS

| | | | | |
|---|---|---|---|---|
| 2,958,578 A | * | 11/1960 | Baker et al. | 423/326 |
| 4,666,250 A | | 5/1987 | Southwell | |
| 5,000,575 A | | 3/1991 | Southwell et al. | |
| 5,485,188 A | * | 1/1996 | Tochihara et al. | 347/100 |
| 2002/0094420 A1 | * | 7/2002 | Hatano et al. | 428/195 |
| 2006/0068132 A1 | * | 3/2006 | Nakao et al. | 428/32.34 |
| 2008/0160454 A1 | * | 7/2008 | Shimomura | B41J 2/1603 430/320 |
| 2010/0321613 A1 | | 12/2010 | Hatusda et al. | |
| 2011/0100424 A1 | | 5/2011 | Roche et al. | |

FOREIGN PATENT DOCUMENTS

| | | |
|---|---|---|
| KR | 1020100133378 A | 12/2010 |
| KR | 1020110039862 A | 4/2011 |
| WO | 2011050228 A2 | 4/2011 |

OTHER PUBLICATIONS http://cameo.mfa.org/wiki/Polyvinyl_alcohol.*
http://refractiveindex.info/?shelf=other&book=air&page=Ciddor.*

* cited by examiner

*Primary Examiner* — Aaron Austin
*Assistant Examiner* — Lawrence Ferguson
(74) *Attorney, Agent, or Firm* — Cantor Colburn LLP

(57) ABSTRACT

An article including a polymer element including a polymer, and inorganic particles having a concentration gradient which decreases in concentration from at least one surface of the polymer element to the inside thereof, wherein the inorganic particles have a refractive index that is greater than or equal to the refractive index of air and less than the refractive index of the polymer.

14 Claims, 9 Drawing Sheets

ARTICLE, METHOD OF PREPARING SAME, AND DISPLAY DEVICE INCLUDING THE SAME

CROSS-REFERENCE TO RELATED APPLICATION

This application claims priority to and the benefit of Korean Patent Application No. 10-2012-0012562, filed on Feb. 7, 2012, and all the benefits accruing therefrom under 35 U.S.C. §119, the entire contents of which are incorporated herein by reference.

BACKGROUND

1. Field

An article, a method of preparing the same, and a display device including the article are disclosed.

2. Description of the Related Art

A colorless transparent material has been developed for a diverse range of applications, such as for an optical lens, a functional optical film, and a disk substrate, but as information devices are further miniaturized and display devices provide higher resolution, more functions and greater performance are required from the material.

Therefore, there remains a need for a colorless transparent material having excellent or improved transparency, heat resistance, mechanical strength, and flexibility.

SUMMARY

An exemplary embodiment provides an article including a polymer element, for example a layer, having excellent transparency, heat resistance, mechanical strength, and flexibility.

Another embodiment provides a method of preparing the article.

Yet another embodiment provides a display device including the article.

According to an embodiment, an article is provided that includes a polymer element including a polymer and inorganic particles having a concentration gradient which decreases in concentration from at least one surface of the polymer element to the inside thereof.

The inorganic particle may have a refractive index that is greater than or equal to the refractive index of air and less than the refractive index of the polymer.

The inorganic particles may have a continuous concentration gradient.

When in the form of a layer, the polymer element may have a thickness of about 1 micrometer (μm) to about 1000 μm.

The concentration gradient of the inorganic particle may be within a depth of about 3 μm from the surface of the polymer element.

The polymer may have a refractive index of about 1.5 to about 1.8.

The polymer may be a poly(amide-imide) block copolymer including a first segment including a repeating unit represented by the following Chemical Formula 1, a repeating unit represented by the following Chemical Formula 2, or a combination thereof; and a second segment including a repeating unit represented by the following Chemical Formula 3.

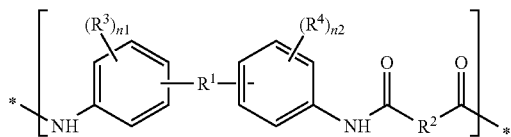

Chemical Formula 1

In Chemical Formula 1,
$R^1$ is the same or different in each repeating unit, and each is independently —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, a substituted or unsubstituted C5 to C30 alicyclic group fused to each phenyl ring to provide a condensed cyclic group, a substituted or unsubstituted C3 to C30 alicyclic group, a substituted or unsubstituted C2 to C30 heterocyclic group, a substituted or unsubstituted C13 to C20 fluorenylene group, or a substituted or unsubstituted C6 to C30 aromatic group, wherein the alicyclic group, the heterocyclic group, or the aromatic group is present singularly; at least two of the alicyclic group, the heterocyclic group, or the aromatic group are linked to provide a condensed cyclic group; or at least two of the alicyclic groups, the heterocyclic groups, or the aromatic groups are linked via a single bond, a substituted or unsubstituted C13 to C20 fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—,
$R^2$ is the same or different in each repeating unit, and each is independently a substituted or unsubstituted C6 to C30 aromatic group,
$R^3$ and $R^4$ are the same or different in each repeating and are each independently hydrogen, a halogen, a hydroxy group, an alkoxy group (—OR$^{200}$, wherein R$^{200}$ is a C1 to C10 aliphatic group), a silyl group (—SiR$^{201}$R$^{202}$R$^{203}$, wherein R$^{201}$, R$^{202}$, and R$^{203}$ are the same or different and are each independently hydrogen or a C1 to C10 aliphatic group), a substituted or unsubstituted C1 to C10 aliphatic group, or a C6 to C20 aromatic group, and
n1 and n2 are the same or different in each repeating and each independently integers ranging from 0 to 4.

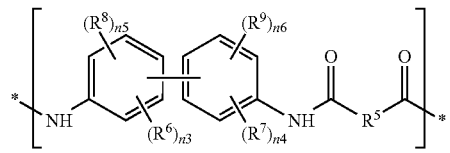

Chemical Formula 2

In Chemical Formula 2,
$R^5$ is the same or different in each repeating unit, and each is independently a substituted or unsubstituted C6 to C30 aromatic group,
$R^6$ and $R^7$ are the same or different in each repeating unit, and are each independently an electron withdrawing group, $R^8$ and $R^9$ are the same or different in each repeating unit, and are each independently hydrogen, a halogen, a hydroxy group, an alkoxy group (—OR$^{204}$, wherein R$^{204}$ is a C1 to C10 aliphatic group), a silyl group (—SiR$^{205}$R$^{206}$R$^{207}$, wherein R$^{205}$, R$^{206}$, and R$^{207}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, n3 is the same or different in each repeating unit and is an integer ranging from 1 to 4, n5 is the same or different in each repeating unit and is an integer ranging from 0 to 4, and a sum of n3 and n5 is an integer ranging from 1 to 4, n4 is the same or different in each repeating unit and is an integer ranging from 1 to 4, n6 is the same or different in each repeating unit and is an integer ranging from 0 to 4, and a sum of n4 and n6 is an integer ranging from 1 to 4.

Chemical Formula 3

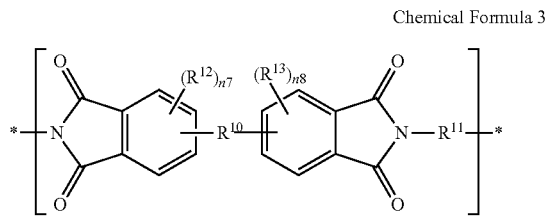

In Chemical Formula 3,

R$^{10}$ is the same or different in each repeating unit, and each is independently a single bond, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, —O—, —S—, —S(=O)$_2$—, or —C(=O)—, R$^{11}$ is the same or different in each repeating unit, and each independently is a substituted or unsubstituted C6 to C30 aromatic group, or a substituted or unsubstituted C3 to C30 alicyclic group, wherein the alicyclic group, or the aromatic group is present singularly; at least two of the alicyclic groups or aromatic groups are linked to provide a condensed cyclic group; or at least two of the alicyclic groups or aromatic groups are linked via a single bond, a substituted or unsubstituted C13 to C20 fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, R$^{12}$ and R$^{13}$ are the same or different in each repeating unit and are each independently hydrogen, a halogen, a hydroxyl group, an ether group (—OR$^{208}$, wherein R$^{208}$ is a C1 to C10 aliphatic group), a silyl group (—SiR$^{209}$R$^{210}$R$^{211}$, wherein R$^{209}$, R$^{210}$ and R$^{211}$ are the same or different and are each independently hydrogen or a C1 to C10 aliphatic group), a substituted or unsubstituted C1 to C10 aliphatic group, a substituted or unsubstituted C3 to C30 alicyclic group, or a C6 to C20 aromatic group, and n7 and n8 are the same or different in each repeating unit and are each independently integers ranging from 0 to 3.

The inorganic particle may have a refractive index of about 1.0 to about 1.6.

The inorganic particle may include silica (SiO$_2$), sodium carbonate (Na$_2$CO$_3$), sodium nitrate (NaNO$_3$), sodium sulfate, potassium carbonate, potassium nitrate, potassium sulfate (K$_2$SO$_4$), or a combination thereof.

The inorganic particle may have a particle diameter of about 0.1 nm to about 400 nm.

The article may be a film, a fiber, a coating material, or an adhesive.

The article may have an average light transmittance of greater than or equal to about 80% at a wavelength range of about 380 nm to about 780 nm.

The article may have a light transmittance of greater than or equal to about 80% at a wavelength of about a 400 nm wavelength.

According to another embodiment, a method of manufacturing an article is provided that includes: providing a polymer element including a polymer; contacting a surface of the polymer element with inorganic particles, an inorganic particle precursor, or a combination thereof and a solvent that dissolves the polymer; and removing the solvent from the contacted polymer element to provide the article including the inorganic particle having a concentration gradient to the polymer element. The inorganic particle may have a concentration gradient which decreases in concentration from at least one surface of the polymer element to the inside thereof, and the inorganic particle may have a refractive index that is greater than or equal to the refractive index of air and less than the refractive index of the polymer.

The solvent that dissolves the polymer may include acetone, methanol, ethanol, tetrahydrofuran (THF), N-methyl-2-pyrrolidone, N,N-dimethyl acetamide (DMAc), dimethyl formamide (DMF), dimethyl sulfoxide (DMSO), ethylacetate, water, or a combination thereof.

The inorganic particle may include (SiO$_2$), sodium carbonate (Na$_2$CO$_3$), sodium nitrate (NaNO$_3$), sodium sulfate, potassium carbonate, potassium nitrate, potassium sulfate (K$_2$SO$_4$), or a combination thereof.

The contacting the solution with at least one surface of the polymer element may be performed by bar coating, dip coating, slot die coating, spin coating, roll coating, or a combination thereof.

A catalyst may be further added to the solvent that dissolves the polymer.

The method may further include contacting a solution including a catalyst with at least one surface of the polymer element.

The catalyst may include one selected from acetic acid, hydrochloric acid, ammonium hydroxide, and a combination thereof.

Removing the solvent, for example by drying, may be performed at a temperature of about 20° C. to about 150° C.

According to another embodiment, a display device including the article is provided.

BRIEF DESCRIPTION OF THE DRAWINGS

The above and other aspects, advantages and features of this disclosure will become more apparent by describing in further detail embodiments thereof with reference to the accompanying drawings.

DETAILED DESCRIPTION

Figure 1:
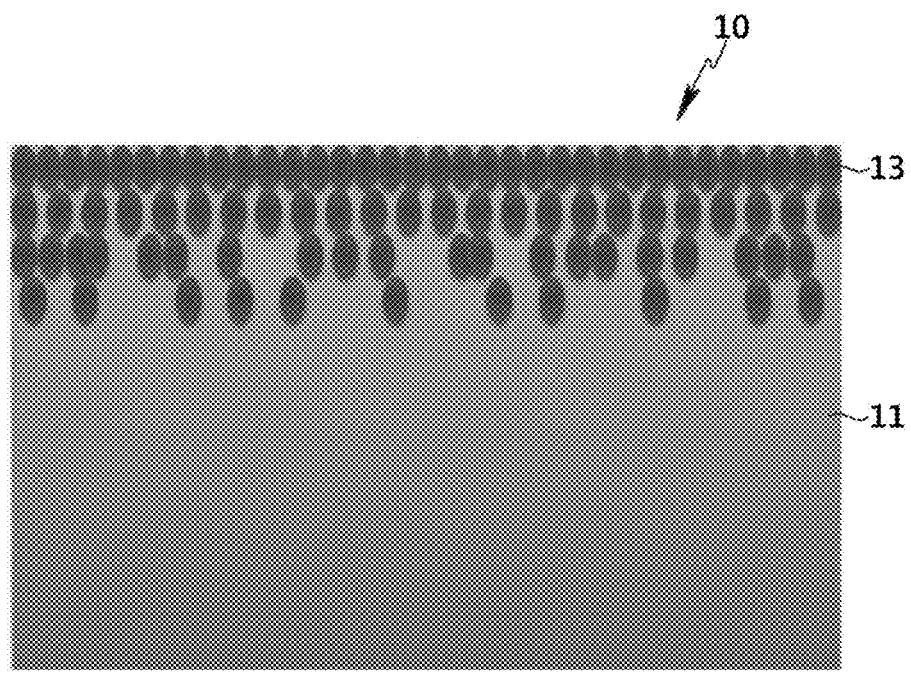
FIG. 1 is a cross-sectional view of a polymer element in accordance with an embodiment wherein the polymer element is shown as a layer.

This disclosure will be described more fully hereinafter with reference to the accompanying drawings, in which various embodiments are shown. This disclosure may, however, be embodied in many different forms and should not be construed as limited to the exemplary embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are not to scale for clarity.

It will be understood that when an element such as a layer, film, region, or substrate is referred to as being "on" or "disposed on" another element, it can be directly on the other element or intervening elements may also be present. In contrast, when an element is referred to as being "directly on" or "directly disposed on" another element, there are no intervening elements present.

The terminology used herein is for the purpose of describing particular embodiments only and is not intended to be limiting. As used herein, the singular forms "a," "an," and "the" are intended to include the plural forms as well, including "at least one," unless the content clearly indicates otherwise. "Or" means "and/or." It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

As used herein, when a specific definition is not otherwise provided, the term "substituted" refers to a compound or group substituted with a substituent including a halogen (specifically the halogens —F, —Br, —Cl, or —I), a hydroxyl group, a nitro group, a cyano group, an amino group (—$NH_2$, —$NH(R^{100})$, or —$N(R^{101})(R^{102})$, wherein $R^{100}$, $R^{101}$, and $R^{102}$ are the same or different and are each independently a C1 to C10 alkyl group, an amidino group, a hydrazino group, a hydrazono group, a carboxyl group (—C(=O)OH), an ester group, a ketone group, a substituted or unsubstituted C1 to C30 alkyl group, a substituted or unsubstituted C3 to C30 alicyclic group, a substituted or unsubstituted C6 to C30 aryl group, a substituted or unsubstituted C2 to C30 alkenyl group, a substituted or unsubstituted C2 to C30 alkynyl group, a substituted or unsubstituted C5 to C30 heteroaryl group, and a substituted or unsubstituted C2 to C30 heterocyclic group, instead of a functional group, or two or more of the foregoing substituents may be linked to each other to provide a ring, provided that the substituted atom's normal valence is not exceeded.

As used herein, when a specific definition is not otherwise provided, the term "alkyl" group refers to a straight or branched chain saturated aliphatic hydrocarbon having the specified number of carbon atoms, for example a C1 to C30 alkyl group, and specifically a C1 to C15 alkyl group, and having a valence of at least one, optionally substituted with one or more substituents where indicated, provided that the valence of the alkyl group is not exceeded. Non-limiting examples include methyl, ethyl, propyl, trifluoromethyl, difluoromethyl, 2-fluoroethyl, and penta-fluoroethyl.

The term "cycloalkyl" group refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, optionally bridged, and optionally substituted with one or more substituents where indicated, provided that the valence of the alkyl group is not exceeded. Cycloalkyl groups do not include an aromatic ring or a heterocyclic ring. When the numbers of carbon atoms is specified, for example a C3 to C30 cycloalkyl group, and specifically a C3 to C18 cycloalkyl group, wherein the number means the number of ring members present in the one or more rings. Any additional rings may be fused, pendant, spirocyclic, bridged, or a combination thereof.

The term "cycloalkenyl" group refers to a stable monovalent aliphatic monocyclic or polycyclic group having at least one carbon-carbon double bond, wherein all ring members are carbon, the group having the specified number of carbon atoms, optionally bridged, and optionally substituted with one or more substituents where indicated, provided that the valence of the cycloalkenyl group is not exceeded. More than one ring may be present, and any additional rings may be independently, aromatic, saturated, or partially saturated, and may be fused, pendant, spirocyclic, bridged, or a combination thereof. Non-limiting examples include cyclopentenyl and cyclohexenyl.

The term "cycloalkynyl" group refers to a stable aliphatic monocyclic or polycyclic group having at least one carbon-carbon triple bond, wherein all ring members are carbon, the group having the specified number of carbon atoms, optionally bridged, and optionally substituted with one or more substituents where indicated, provided that the valence of the cycloalkynyl group is not exceeded. More than one ring may be present, and any additional rings may be independently, aromatic, saturated, or partially saturated, and may be fused, pendant, spirocyclic, bridged, or a combination thereof. Non-limiting examples include cyclohexynyl.

The term "cycloalkylene" group refers to a divalent radical formed by the removal of two hydrogen atoms from one or more rings of a cycloalkyl group, as defined above.

The term "cycloalkenylene" group refers to a stable aliphatic 5-15-membered monocyclic or polycyclic, divalent radical having at least one carbon-carbon double bond, which comprises one or more rings connected or bridged together, the group having the specified number of carbon atoms, optionally bridged, and optionally substituted with one or more substituents where indicated, provided that the valence of the cycloalkenylene group is not exceeded. More than one ring may be present, and any additional rings may be independently, aromatic, saturated, or partially saturated, and may be fused, pendant, spirocyclic, bridged, or a combination thereof. Unless mentioned otherwise, the cycloalkenylene radical can be linked at any desired carbon atom provided that a stable structure is obtained. If the cycloalkenylene radical is substituted, this may be so at any desired carbon atom, once again provided that a stable structure is obtained. Non-limiting examples thereof include cyclopentenylene, cyclohexenylene, cycloheptenylene, cyclooctenylene, cyclononenylene, cyclodecenylene, norbornenylene, 2-methylcyclopentenylene, 2-methylcyclooctenylene, and the like.

The term "cycloalkynylene" group refers to a stable aliphatic 8- to 15-membered monocyclic or polycyclic divalent radical having at least one carbon-carbon triple bond and consisting solely of carbon and hydrogen atoms which may comprise one or more pendant, fused or bridged ring(s), preferably a 8- to 10-membered monocyclic or 12- to 15-membered bicyclic ring, the group having the specified number of carbon atoms, optionally substituted with one or more substituents where indicated, provided that the valence of the cycloalkynylene group is not exceeded. More than one ring may be present, and any additional rings may be independently, aromatic, saturated or partially saturated, or a combination thereof. Unless otherwise specified, the cycloalkynylene ring may be attached at any carbon atom which results in a stable structure and, if substituted, may be substituted at any suitable carbon atom which results in a stable structure. Non-limiting examples include cyclooctynylene, cyclononynylene, cyclodecynylene, 2-methylcyclooctynylene, and the like.

The term "alkoxy" group refers to an alkyl group as defined above, having the specified number of carbon atoms, for example a C1 to C30 alkoxy group, and specifically a C1 to C18 alkoxy group, linked via an oxygen, e.g. alkyl-O—.

The term "ester" group refers to a —C(=O)OR group, wherein R is an aliphatic group as defined below, having the specified number of carbon atoms, for example a C2 to C30 ester group, and specifically a C2 to C18 ester group, wherein the carbon of the carbonyl group is included in the specified number of carbon atoms, for example a C2 to C30 ester group, and specifically a C2 to C18 ester group, wherein the carbon of the carbonyl group is included in the specified number of carbon atoms.

The term "ketone" group refers to a —C(=O)R group, wherein R is an aliphatic group as defined below, having the specified number of carbon atoms, for example C2 to C30 ketone group, and specifically a C2 to C18 ketone group, wherein the carbon of the carbonyl group is included in the specified number of carbon atoms.

The term "aryl group" refers to a cyclic group in which all ring members are carbon and at least one ring is aromatic, the group having the specified number of carbon atoms, for example a C6 to C30 aryl group, and specifically a C6 to C18 aryl group, and having a valence of at least one, optionally substituted with one or more substituents where indicated, provided that the valence of the aryl group is not exceeded. More than one ring may be present, and any additional rings may be independently aromatic, saturated, or partially unsaturated and multiple rings, if present, may be fused, pendent, spirocyclic, bridged, linked via a substituted or unsubstituted C1 to C18 alkylene group, or a combination thereof. Non-limiting examples include phenyl, naphthyl, and tetrahydronapthyl groups.

The term "aryloxy" group refers to an aryl group as defined above, having the specified number of carbon atoms, for example a C6 to C30 aryloxy group, and specifically a C6 to C18 aryloxy group, linked via an oxygen, e.g. aryl-O—.

The term "alkenyl" group refers to a straight or branched chain hydrocarbon that comprises at least one carbon-carbon double bond, having the specified number of carbon atoms, for example a C2 to C30 alkenyl group, and specifically a C2 to C18 alkenyl group, and having a valence of at least one, optionally substituted with one or more substituents where indicated, provided that the valence of the alkenyl group is not exceeded.

The term "alkynyl" group refers to a straight or branched chain, monovalent hydrocarbon group having at least one carbon-carbon triple bond, having the specified number of carbon atoms, for example a C2 to C30 alkynyl group, and specifically a C2 to C18 alkynyl group, and having a valence of at least one, optionally substituted with one or more substituents where indicated, provided that the valence of the alkynyl group is not exceeded. Non-limiting examples include ethynyl, n-propynyl, or isopropynyl.

The term "alkylene" group refers to a straight or branched chain, saturated, aliphatic hydrocarbon group having the specified number of carbon atoms, for example a C1 to C30 alkylene group, and specifically a C1 to C18 alkylene group, having a valence of at least two, optionally substituted with one or more substituents where indicated, provided that the valence of the alkyl group is not exceeded.

The term "alkenylene" group refers to a straight or branched chain hydrocarbon group having at least one carbon-carbon double bond and having a valence of at least two, optionally substituted with one or more substituents where indicated, provided that the valence of the alkenyl group is not exceeded, and having a specified number of carbon atoms.

The term "alkynylene" group refers to a straight or branched chain divalent aliphatic hydrocarbon that has one or more unsaturated carbon-carbon bonds, at least one of which is a triple bond, optionally substituted with one or more substituents where indicated, provided that the valence of the alkynylene group is not exceeded. Non-limiting examples include ethynylene.

The term "arylene" group refers to a divalent radical formed by the removal of two hydrogen atoms from one or more rings of an aromatic hydrocarbon, wherein the hydrogen atoms may be removed from the same or different rings, each of which rings may be aromatic or nonaromatic, and having the specified number of carbon atoms, for example a C6 to C30 arylene group, and specifically a C6 to C16 arylene group, optionally substituted with one or more substituents where indicated, provided that the valence of the arylene group is not exceeded. More than one ring may be present, and any additional rings may be independently aromatic, saturated, or partially unsaturated and multiple rings, if present, may be fused, pendent, spirocyclic, bridged, linked via a substituted or unsubstituted C1 to C18 alkylene group, or a combination thereof. Non-limiting examples include phenylene, naphthylene, and tetrahydronaphthylene groups.

The term "condensed cyclic group" refers to a group having two or more rings, wherein at least two of the rings are fused, i.e., share at least two carbon atoms. Non-limiting examples include a C6 to C30 cycloalkane, a C5 to C30 heterocycloalkane, or naphthalene.

The term "copolymerization" includes random copolymerization, block copolymerization, or graft copolymerization, and the like, and the terms "polymer" and "copolymer" include a random copolymer, block copolymer, or graft copolymer, and the like.

The term "(meth)acrylate" refers to an acrylate group ($H_2C=CH-C(=O)O-$) and a methacrylate group ($H_2C=C(CH_3)-C(=O)-$), and (meth)acryloxy refers to an acryloxy group and a methacryloxy group.

The term "electron withdrawing group" refers to a halogen, a nitro group, a cyano group, a C1 to C2 haloalkyl group, a C1 to C6 alkanoyl group, a C1 to C6 ester group, or the like.

As used herein, when a specific definition is not otherwise provided, the term "aliphatic group" refers to a C1 to C30 alkyl group, a C2 to C30 alkenyl group, a C2 to C30 alkynyl group, a C1 to C30 alkylene group, C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group.

The term "alicyclic group" refers to a C3 to C30 cycloalkyl group, a C3 to C30 cycloalkenyl group, a C3 to C30 cycloalkynyl group, a C3 to C30 cycloalkylene group, C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group The term "aromatic group" refers to a C6 to C30 aryl group or a C6 to C30 arylene group, for example a C6 to C16 aryl group or a C6 to C16 arylene group.

The term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group, wherein the foregoing heterocyclic groups each includes 1 to 3 heteroatoms selected from O, S, N, P, Si, and a combination thereof in one ring. Other heteroatoms may also be present. More than one ring may be present and any additional rings may each be independently aromatic, saturated or partially unsaturated, and multiple rings, if present, may be fused, pendant, spirocyclic, bridged, or a combination thereof.

As used herein, when a definition is not otherwise provided, "combination" includes a mixture, a copolymer, a stacked structure, a composite, an alloy, a blend, a reaction product, or the like, and the term "combining" is inclusive of mixing or copolymerizing. In addition, in the specification, the mark "*" refers to a point of attachment to a group or a repeating unit An embodiment provides an article including a polymer element including a polymer, and inorganic particles having a concentration gradient which decreases in concentration from at least one surface of the polymer element to the inside thereof. The inorganic particles have a refractive index that is greater than or equal to the refractive index of air and less than the refractive index of the polymer.

Since the inorganic particles have a concentration gradient which decreases in concentration from at least one surface of the polymer element to the inside thereof, the polymer element may have a gradually increased refractive index from the surface of the polymer element toward the inside thereof. While not wishing to be bound by theory, it is believed the light intensity reflected from the surface of the polymer element may be reduced, and the light reflected from the inside of the polymer element may be prevented or mitigated or reduced, so that the light transmittance of an article including the polymer element may be improved. In addition, the surface of the polymer element may be locally dissolved during a coating process, and the adhesion strength between the inorganic particle and the polymer may be improved.

The polymer element may be in any configuration, for example a layer (which includes a film and a sheet), a fiber, or other regular or irregular three-dimensional shape having a surface and an inner portion. In an embodiment, the polymer element is a layer. The layer may be disposed on a substrate, where the substrate is a layer (including a film or sheet), a fiber, or other regular or irregular three-dimensional shape. The layer may be conformal to the underlying substrate.

The structure of the polymer element, for example a layer is described referring to FIG. 1. FIG. 1 is a cross-sectional view of a polymer layer 10 in accordance with an embodiment.

Referring to FIG. 1, the polymer layer 10 includes a polymer 11, and inorganic particles 13 having a concentration gradient which decreases in concentration from the surface of the polymer layer 10 toward the inside thereof. The inorganic particles 13 are disposed within the polymer 11.

Within the polymer layer 10, the inorganic particle 13 may have a continuous concentration gradient. In this embodiment, the refractive index of the polymer layer 13 may be gradually and continuously increased from the surface of the polymer layer to the inside thereof. Accordingly, the light reflection inside the polymer layer due to the refractive index difference may be effectively prevented, mitigated, or reduced.

The polymer layer may have a thickness of about 1 micrometer (μm) to about 1000 μm, specifically, a thickness of about 20 μm to about 100 μm, more specifically, a thickness of about 25 μm to about 50 μm, and even more specifically, a thickness of about 50 μm, but is not limited thereto. The thickness may be appropriately adjusted according to the usage.

The concentration gradient of the inorganic particle may be provided within a depth of about 3 micrometers (μm) from the surface of polymer element. In an embodiment, when a small amount of inorganic particle is used, the light reflection from the surface and the inside of the polymer element may be effectively prevented or reduced, so that the light transmittance may be improved. For example, the concentration gradient of the inorganic particle may be provided within a depth of about 1 μm from the surface of the polymer element, specifically within a depth of about 500 nanometers (nm), or more specifically within a depth of about 400 nm, or even more specifically within a depth of about 300 nm, or even more specifically within a depth of about 260 nm, or even more specifically within a depth of about 250 nm.

The polymer included in the polymer element may have a refractive index of about 1.5 to about 1.8. For example, the polymer included in the polymer element may have a refractive index of about 1.6 to about 1.7.

In an embodiment, the polymer may be a poly(amide-imide) block copolymer including a first segment including a repeating unit represented by the following Chemical Formula 1, a repeating unit represented by the following Chemical Formula 2, or a combination thereof; and a second segment including a repeating unit represented by the following Chemical Formula 3, but is not limited thereto.

Chemical Formula 1

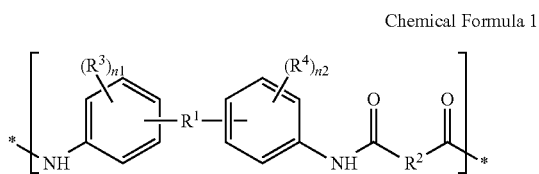

In Chemical Formula 1, $R^1$ is the same or different in each repeating unit, and each is independently —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, a substituted or unsubstituted C5 to C30 alicyclic group fused to each phenyl ring to provide a condensed cyclic group, a substituted or unsubstituted C3 to C30 alicyclic group, a substituted or unsubstituted C2 to C30 heterocyclic group, a substituted or unsubstituted C13 to C20 fluorenylene group, or a substituted or unsubstituted C6 to C30 aromatic group, wherein the alicyclic group, the heterocyclic group, or the aromatic group is present singularly; at least two of the alicyclic group, the heterocyclic group, or the aromatic group are linked to provide a condensed cyclic group; or at least two of the alicyclic groups, the heterocyclic groups, or the aromatic groups are linked via a single bond, a substituted or unsubstituted C13 to C20 fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—. More specifically, $R^1$ of Chemical Formula 1 may each independently be —O—, —S—, —C(=O)—, —CH(OH)—, —S(=O)$_2$—, —(CH$_2$)$_p$—, a substituted or unsubstituted C3 to C20 alicyclic group, a substituted or unsubstituted C2 to C15 heterocyclic group, a substituted or unsubstituted C13 to C20 fluorenylene group, or a substituted or unsubstituted C6 to C20 aromatic group, wherein the alicyclic group, the heterocyclic group, or the aromatic group is present singularly; at least two of the alicyclic group, the heterocyclic group, or the aromatic group are linked to provide a condensed cyclic group; or at least two of the alicyclic group, the heterocyclic group, or the aromatic group are linked via a single bond. Still more specifically, $R^1$ of Chemical Formula 1 may each independently be —O—, —S—, —C(=O)—, —S(=O)$_2$—, —(CH$_2$)$_p$—, a substituted or unsubstituted C3 to C18 cycloalkylene group, a C3 to C18 cycloalkenylene group optionally bridged and/or optionally substituted with an oxo group, a C2 to C15 heterocycloalkenylene group, a substituted or unsubstituted C13 to C20 fluorenylene group, or a substituted or unsubstituted C6 to C20 arylene group, wherein the cycloalkylene group, the cycloalkenylene group, the heterocycloalkenylene group, or the arylene group is present singularly; at least two of the cycloalkylene group, the cycloalkenylene group, the heterocycloalkenylene group, or the arylene group are linked to provide a condensed cyclic group; or at least two of the cycloalkylene group, the cycloalkenylene group, the heterocycloalkenylene group, or the arylene group are linked via a single bond.

$R^2$ in Chemical Formula 1 is the same or different in each repeating unit, and each is independently a substituted or unsubstituted C6 to C30 aromatic group, and in an embodiment $R^2$ is each independently a substituted or unsubstituted C6 to C30 arylene group, and in another embodiment $R^2$ is each independently a substituted or unsubstituted phenylene group, a substituted or unsubstituted biphenylene group, a substituted or unsubstituted triphenylene group, a multi-ring system comprising at least two substituted or unsubstituted C6 to C30 phenylene groups linked via a single bond or a substituted or unsubstituted C1 to C18 alkylene group, or a combination thereof.

$R^3$ and $R^4$ in Chemical Formula 1 are the same or different in each repeating unit, and are each independently hydrogen, a halogen, a hydroxy group, an alkoxy group (—OR$^{200}$, wherein R$^{200}$ is a C1 to C10 aliphatic group), a silyl group (—SiR$^{201}$R$^{202}$R$^{203}$, wherein R$^{201}$, R$^{202}$, and R$^{203}$ are the same or different and are each independently hydrogen or a C1 to C10 aliphatic group), a substituted or unsubstituted C1 to C10 aliphatic group, or a C6 to C20 aromatic group, and in an embodiment, $R^3$ and $R^4$ are each independently hydrogen, a halogen, a hydroxyl group, an alkoxy group, a substituted or unsubstituted C1 to C10 alkyl group, a substituted or unsubstituted C3 to C15 cycloalkyl group, or a substituted or unsubstituted C6 to C20 aryl group, and in an embodiment, hydrogen, or a substituted or unsubstituted C1 to C5 alkyl group.

n1 and n2 are the same or different in each repeating unit and are each independently integers ranging from 0 to 4.

In an embodiment, $R^1$ in Chemical Formula 1 is the same or different in each repeating unit, and each is independently the following chemical formulae, but is not limited thereto.

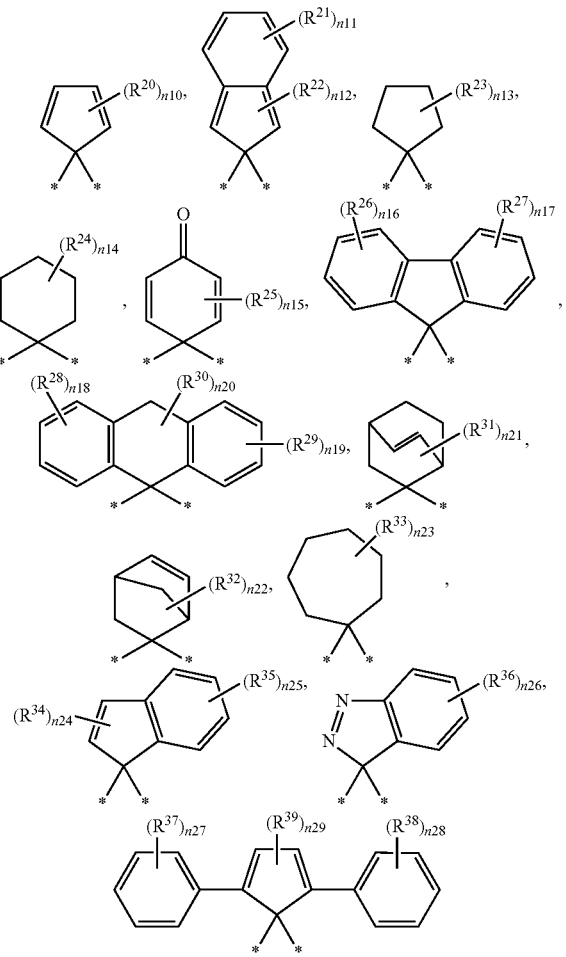

In the above chemical formulae, $R^{20}$ to $R^{39}$ are the same if different, and are each independently hydrogen, deuterium, a halogen, or a substituted or unsubstituted C1 to C10 alkyl group, and in an embodiment, hydrogen or a substituted or unsubstituted C1 to C5 alkyl group, integer ranging from 0 to 4, n10, n11, n15, n16, n17, n18, n19, n25, and n26 are each independently an integer ranging from 0 to 4, n12, n20, n24, and n29 are each independently an integer ranging from 0 to 2, n13 is an integer ranging from 0 to 8, n14 and n21 are each independently an integer ranging from 0 to 10, n22 is an integer ranging from 0 to 6, n23 is an integer ranging from 0 to 12, and n27 and n28 are each independently an integer ranging from 0 to 5.

In an embodiment, $R^2$ in Chemical Formula 1 is the same or different in each repeating unit, and each is independently according to the following chemical formulae, but is not limited thereto.

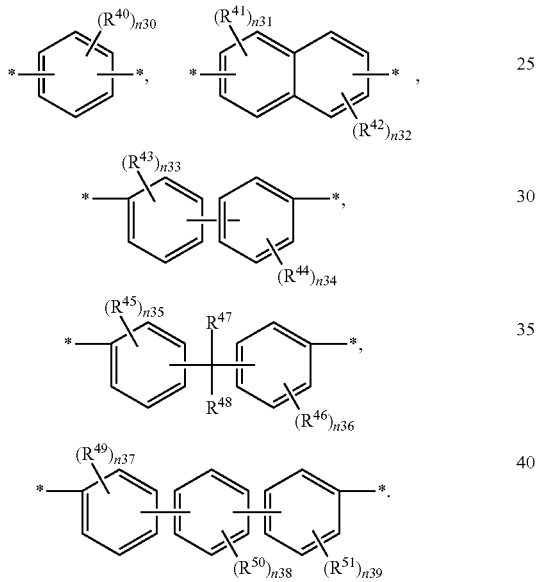

In the above chemical formulae, $R^{40}$ to $R^{51}$ are the same or different, and are each independently hydrogen, deuterium, a halogen, a substituted or unsubstituted C1 to C10 aliphatic group, or a substituted or unsubstituted C6 to C20 aromatic group, and in an embodiment, $R^{40}$ to $R^{51}$ are each independently hydrogen, a substituted or unsubstituted C1 to C10 alkyl group, or a substituted or unsubstituted C6 to C20 aryl group, and in another embodiment, $R^{40}$ to $R^{51}$ are each independently hydrogen, methyl, ethyl, propyl, butyl, pentyl, hexyl, trifluoromethyl, difluoromethyl, 2-fluoroethyl, or penta-fluoroethyl, n30, and n33 to n39 are each independently an integer ranging from 0 to 4, and n31 and n32 are each independently an integer ranging from 0 to 3.

In another embodiment, $R^2$ is the same or different in each repeating unit, and each is independently according to the following chemical formulae, but is not limited thereto.

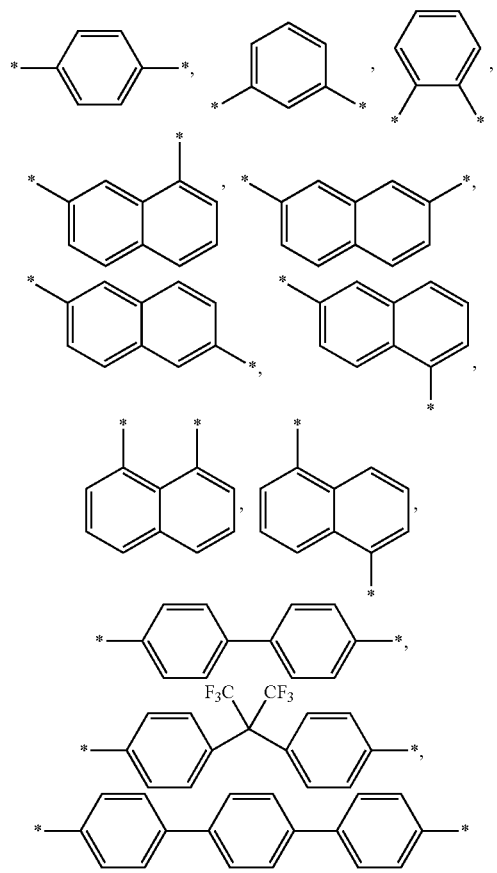

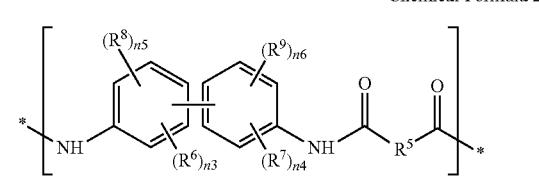

Chemical Formula 2

In Chemical Formula 2, $R^5$ is the same or different in each repeating unit, and each is independently a substituted or unsubstituted C6 to C30 aromatic group, and in an embodiment $R^{21}$ is each independently a substituted or unsubstituted C6 to C30 arylene group, and in another embodiment $R^{21}$ is each independently a substituted or unsubstituted phenylene group, a substituted or unsubstituted biphenylene group, a substituted or unsubstituted triphenylene group, a multi-ring ring system comprising at least two substituted or unsubstituted C6 to C30 phenylene groups linked via a single bond or a substituted or unsubstituted C1 to C18 alkylene group, or a combination thereof.

$R^6$ and $R^7$ in Chemical Formula 2 are the same or different in each repeating unit, and are each independently an electron withdrawing group, and in an embodiment $R^6$ and $R^7$ are each independently a halogen, a nitro group, a cyano group, a C1 to C2 haloalkyl group, a C1 to C6 alkanoyl group, or a C1 to C6 ester group, and in another embodiment, $R^6$ and $R^7$ are each independently —$CF_3$, —$CCl_3$, —$CBr_3$, —F, —Cl, —Br, —I, —$NO_2$, —CN, —$COCH_3$, or —$CO_2C_2H_5$ $R^8$ and $R^9$ in Chemical Formula 2 are the same or different in each repeating unit, and are each independently hydrogen, a halogen, a hydroxy group, an alkoxy group (—OR$^{204}$, wherein R$^{204}$ is a C1 to C10 aliphatic group), a silyl group (—SiR$^{205}$R$^{206}$R$^{27}$, wherein R$^{205}$, R$^{206}$, and R$^{207}$ are the same or different and are each independently hydrogen or a C1 to C10 aliphatic group), a substituted or unsubstituted C1 to C10 aliphatic group, a substituted or unsubstituted C3 to C30 alicyclic group, or a C6 to C20 aromatic group, and in an embodiment, R$^8$ and R$^9$ are each independently hydrogen, a halogen, a hydroxyl group, an alkoxy group, a substituted or unsubstituted C1 to C10 alkyl group, a substituted or unsubstituted C3 to C15 cycloalkyl group, or a substituted or unsubstituted C6 to C20 aryl group, and in another embodiment, R$^8$ and R$^9$ are each independently hydrogen or a substituted or unsubstituted C1 to C5 alkyl group.

n3 in Chemical Formula 2 is the same or different in each repeating unit and is an integer ranging from 1 to 4, n5 is the same or different in each repeating unit and is an integer ranging from 0 to 4, the sum of n3 and n5 is an integer ranging from 1 to 4, and n4 in Chemical Formula 2 is the same or different in each repeating unit and is an integer ranging from 1 to 4, n6 is the same or different in each repeating unit and is an integer ranging from 0 to 4, and the sum of n4 and n6 is an integer ranging from 1 to 4.

In an embodiment, R$^5$ in Chemical Formula 2 is the same or different in each repeating unit, and each is independently according to the following chemical formulae, but is not limited thereto.

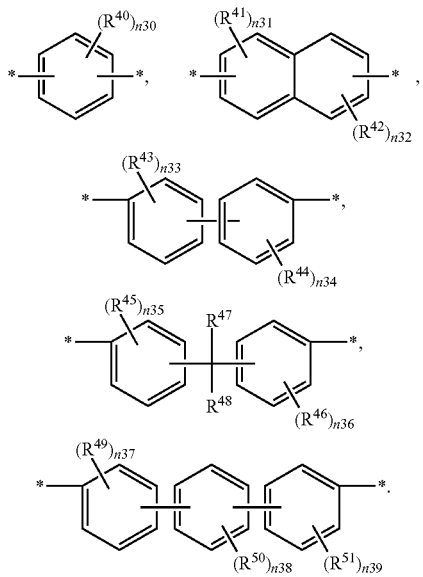

In the above chemical formulae,

R$^{40}$ to R$^{51}$, and n30 to n39 are the same as described above for R$^2$ in Chemical Formula 1.

In another embodiment, R$^6$ and R$^7$ are each an electron withdrawing group, wherein the electron withdrawing group may be —CF$_3$, —CCl$_3$, —CBr$_3$, —F, —Cl, —Br, —I, —NO$_2$, —CN, —COCH$_3$, or —CO$_2$C$_2$H$_5$, but is not limited thereto.

In another embodiment, R$^5$ is the same or different in each repeating unit, and each is independently according to the following chemical formulae, but is not limited thereto.

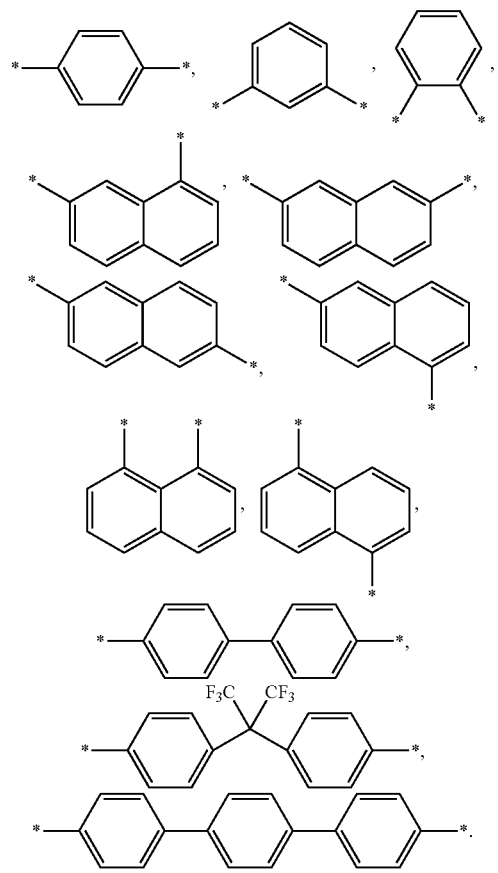

The first segment including the repeating unit represented by Chemical Formula 1, the repeating unit represented by Chemical Formula 2, or a combination thereof is an amide block, and thus, while not wishing to be bound by theory, it is believed the first segment may have excellent or improved solubility in a solvent, workability, flexibility, and optical properties, and may decrease a coefficient of thermal expansion. Therefore, the poly(amide-imide) block copolymer including the first segment may have excellent optical properties, for example transparency, and excellent workability and flexibility, and a low coefficient of thermal expansion.

The first segment may be the same or different in each poly(amide-imide) block copolymer, and each independently includes about 1 to about 1000 repeating units of the repeating unit represented by Chemical Formula 1, the repeating unit represented by Chemical Formula 2, or a combination thereof. When the first segment is included as a block of this size, the optical properties, workability, and flexibility of the poly(amide-imide) block copolymer including the first segment, may be effectively improved. In an embodiment, the first segment is the same or different in each poly(amide-imide) block copolymer, and each may independently include about 1 to about 100, specifically about 1 to about 20, repeating units of the repeating unit represented by Chemical Formula 1, the repeating unit represented by Chemical Formula 2, or a combination thereof.

The first segment may have a weight average molecular weight of about 500 grams per mole (g/mol) to about 50,000 g/mol. When the weight average molecular weight of the first segment is within the foregoing range, the optical properties, workability, and flexibility of the poly(amide-imide) block copolymer including the first segment may be effectively improved. In an embodiment, the first segment may have a weight average molecular weight of about 5000 g/mol to about 30,000 g/mol, and more particularly the first segment may have a weight average molecular weight of about 7500 g/mol to about 25,000 g/mol.

Chemical Formula 3

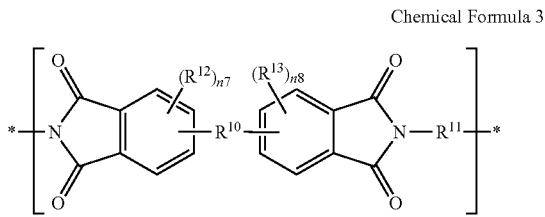

In Chemical Formula 3, $R^{10}$ is the same or different in each repeating unit, and each is independently a single bond, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, —O—, —S—, —S(=O)$_2$—, or —C(=O)—, and in an embodiment, $R^{10}$ may be a single bond, a substituted or unsubstituted C1 to C10 aliphatic group, a substituted or unsubstituted C3 to C10 alicyclic group, a substituted or unsubstituted C6 to C15 aromatic group, a substituted or unsubstituted C2 to C15 heterocyclic group, —O—, —S—, —S(=O)$_2$—, or —C(=O)—, and in another embodiment, $R^{10}$ may be a single bond or a substituted or unsubstituted C1 to C10 aliphatic group, and in yet another embodiment, $R^5$ may be a single bond or —C(CF$_3$)$_2$—

$R^{11}$ in Chemical Formula 3 is the same or different in each repeating unit, and each independently is a substituted or unsubstituted C6 to C30 aromatic group, or a substituted or unsubstituted C3 to C30 alicyclic group, wherein the alicyclic group, or aromatic group is present singularly, at least two of the alicyclic groups or aromatic groups are linked to provide a condensed cyclic group, or at least two of the alicyclic groups or aromatic groups are linked via a single bond, a substituted or unsubstituted C13 to C20 fluorenylene group, a substituted or unsubstituted C3 to C30 alicyclic group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—. In an embodiment at least one alicyclic group, or aromatic group may be substituted with an electron withdrawing group, wherein the electron withdrawing group is the same as described above for $R^6$ and $R^7$ in Chemical Formula 2.

$R^{12}$ and $R^{13}$ in Chemical Formula 3 are the same or different in each repeating unit, and are each independently hydrogen, a halogen, a hydroxyl group, an ether group (—OR$^{208}$, wherein $R^{208}$ is a C1 to C10 aliphatic group), a silyl group (—SiR$^{209}$R$^{210}$R$^{211}$ wherein R$^{209}$, R$^{210}$, and R$^{211}$ are the same or different and are each independently hydrogen or a C1 to C10 aliphatic group), a substituted or unsubstituted C1 to C10 aliphatic group, a substituted or unsubstituted C3 to C30 alicyclic group, or a C6 to C20 aromatic group, and in an embodiment $R^{12}$ and $R^{13}$ are each independently hydrogen or a substituted or unsubstituted C1 to C5 aliphatic group, and in another embodiment $R^{12}$ and $R^{13}$ are each independently hydrogen, a substituted or unsubstituted C1 to C3 aliphatic group, and in yet another embodiment $R^{12}$ and $R^{13}$ are each independently hydrogen, methyl, ethyl, propyl, trifluoromethyl, difluoromethyl, 2-fluoroethyl, or penta-fluoroethyl.

n7 and n8 in Chemical Formula 3 are the same or different in each repeating unit and are each independently an integer ranging from 0 to 3, specifically 0 to 2, and more specifically 0 or 1.

The second segment including the repeating unit represented by Chemical Formula 3 is an imide block. The second segment has excellent or improved heat resistance, and mechanical strength, and excellent or improved solvent resistance, including when an article is manufactured including the same, and thus, the article may have excellent or improved solvent resistance, and may suppress crystallization during elongation. Accordingly, the poly(amide-imide) block copolymer including the second segment may have excellent or improved thermal properties and mechanical strength.

The second segment may be the same or different in each poly(amide-imide) block copolymer, and each is independently about 1 to about 1000 repeating units of the repeating unit represented by Chemical Formula 3, wherein the repeating unit is the same or different in each second segment. When the second segment is included as a block of the above size, the thermal properties, mechanical strength, and optical properties of the poly(amide-imide) block copolymer including the second segment may be effectively improved. In an embodiment, the second segment may be the same or different in the poly(amide-imide) block copolymer, and each independently includes about 1 to about 100, repeating units of the repeating unit represented by Chemical Formula 3, wherein the repeating unit is the same or different in each second segment, specifically about 1 to about 20 repeating units of the repeating unit represented by Chemical Formula 3 wherein the repeating unit is the same or different in each second segment.

The second segment may have a weight average molecular weight of about 500 g/mol to about 50,000 g/mol. When the weight average molecular weight of the second segment is within the foregoing range, the thermal properties, mechanical strength and optical properties of the poly(amide-imide) block copolymer including the second segment may be effectively improved. In an embodiment, the second segment may have a weight average molecular weight of about 5,000 g/mol to about 30,000 g/mol, specifically the second segment may have a weight average molecular weight of about 7500 g/mol to about 25,000 g/mol.

In the poly(amide-imide) block copolymer, the total moles of a repeating unit in the first segment and the total moles of a repeating unit in the second segment may be present at a mole ratio of about 95:5 to about 5:95. When the mole ratio of the total moles of the repeating unit in the first segment to the total moles of the repeating unit in the second segment is within the foregoing range, the poly(amide-imide) block copolymer may have excellent or improved optical properties, heat resistance, mechanical strength, and flexibility. In an embodiment, in the poly(amide-imide) block copolymer, the total moles of a repeating unit in the first segment and the total moles of a repeating unit in the second segment may be present at a mole ratio of about 90:10 to about 10:90, and more specifically about 85:15 to about 15:85.

In an embodiment, in the poly(amide-imide) block copolymer, the repeating unit represented by Chemical Formula 1 may include a repeating unit represented by the following Chemical Formulae 1-1 to 1-9, or a combination thereof, the repeating unit represented by Chemical Formula 2 may include a repeating unit represented by the following Chemical Formulae 2-1 to 2-3, or a combination thereof, and the repeating unit represented by Chemical Formula 3 may include a repeating unit represented by the following Chemical Formula 3-1, Chemical Formula 3-2, or a combination thereof, but they are not limited thereto.
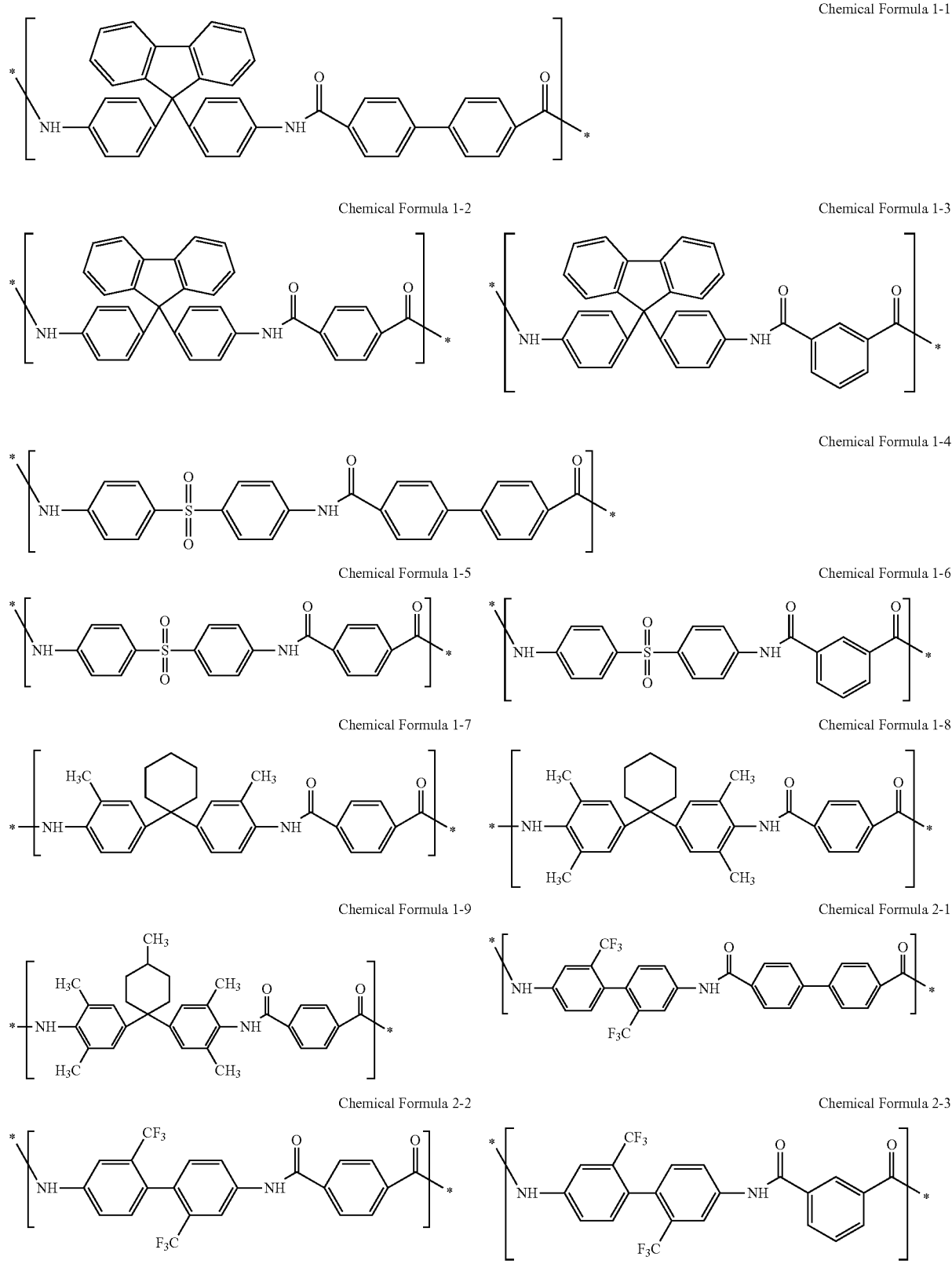

Chemical Formula 3-1

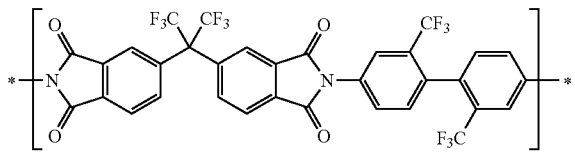

Chemical Formula 3-2

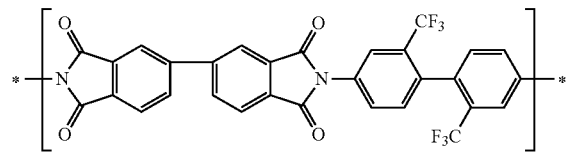

The poly(amide-imide) block copolymer according to an embodiment may facilitate improvement of optical properties of an article including the poly(amide-imide) block copolymer, for example, transparency, heat resistance, mechanical strength, and flexibility, by including the first segment having excellent or improved solubility in a solvent, workability, and optical properties which may decrease the coefficient of thermal expansion, and the second segment having excellent or improved heat resistance, mechanical strength and solvent resistance, when the article is manufactured, and may suppress the generation of crystals during elongation.

Also, since the poly(amide-imide) block copolymer according to an embodiment may be a block copolymer, the chemical structure of the copolymer may be easily controlled, and thus the poly(amide-imide) block copolymer may have a low coefficient of thermal expansion ("CTE").

In an embodiment, the poly(amide-imide) may be a random copolymer having different reactivity of each monomer, and it is difficult to control the chemical structure of the copolymer, and thus the poly(amide-imide) random copolymer may have a high coefficient of thermal expansion ("CTE").

Therefore, the poly(amide-imide) block copolymer may be used in various applications, including as a material for diverse articles, wherein the diverse articles may require transparency. For example, the poly(amide-imide) block copolymer may be useful for a variety of applications, such as a substrate for a display device, which includes a substrate for a flexible display device, a touch panel, a protective film for an optical disk, and the like.

According to an embodiment, the poly(amide-imide) block copolymer may have an average light transmittance of greater than or equal to about 80% at a wavelength range of about 380 nm to about 750 nm, and may have a light transmittance of greater than or equal to about 55% at a wavelength of about 400 nm. When the light transmittance of the poly(amide-imide) block copolymer is within the foregoing range, the poly(amide-imide) block copolymer may be used for manufacturing articles useful for diverse applications including diverse applications requiring transparency, and may have excellent or improved color reproducibility. In an embodiment, the poly(amide-imide) block copolymer may have an average light transmittance of about 80% to about 95% at a wavelength range of about 380 nm to about 750 nm, and may have a light transmittance of about 55% to about 90% at a wavelength of about 400 nm.

Hereafter, a method for preparing the poly(amide-imide) block copolymer is described.

The method for preparing the poly(amide-imide) block copolymer includes: providing (e.g., preparing) a first segment including the repeating unit represented by Chemical Formula 1, the repeating unit represented by Chemical Formula 2, or a combination thereof; providing (e.g., preparing) a precursor of a second segment including the repeating unit represented by Chemical Formula 3; copolymerizing the first segment and the precursor of the second segment; and imidizing the precursor of the second segment, to provide the poly(amide-imide) block copolymer.

Unless otherwise mentioned, the repeating unit represented by Chemical Formula 1, the repeating unit represented by Chemical Formula 2, the first segment, the repeating unit represented by Chemical Formula 3, the second segment, and the poly(amide-imide) block copolymer are as previously described.

The first segment is an amide block, and it may be prepared using a method such as a low-temperature solution polymerization method, an interface polymerization method, a fusion polymerization method, and a solid-phase polymerization method, without limitation.

In an embodiment, a low-temperature solution polymerization method for preparing the first segment is described. According to the low-temperature solution polymerization method, an amide block is prepared by polymerizing dicarboxylic acid dichloride and a diamine in an aprotic polar solvent.

The aprotic polar solvent may include a sulfoxide-containing solvent such as dimethylsulfoxide, and diethylsulfoxide, a formamide-containing solvent such as N,N-dimethylformamide, and N,N-diethylformamide, an acetamide-containing solvent such as N,N-dimethylacetamide, N,N-dimethylmethoxyacetamide, and N,N-diethylacetamide, a pyrrolidone-containing solvent such as N-methyl-2-pyrrolidone, and N-vinyl-2-pyrrolidone, a phenol-containing solvent such as a phenol, an o-, m-, or p-cresol, xylenol, a halogenated phenol, and a catechol, hexamethylphosphoramide, γ-butyrolactone, or a mixture thereof. However, this disclosure is not limited to an aprotic polar solvent, and an aromatic hydrocarbon solvent such as xylene, and toluene may be used. Also, to promote the dissolution of the polymer, an alkali metal salt or an alkaline earth metal salt may be further added to the solvent in an amount of less than or equal to about 50 weight percent (wt %) based on the total amount of the solvent.

The first segment may be obtained by combining (e.g., mixing) and reacting a diamine including 1,1-bis(4-aminophenyl)cyclohexane), 1,1-bis(3-methyl-4-aminophenyl)cyclohexane, 1,1-bis(3,5-dimethyl-4-aminophenyl)cyclohexane, 1,1-bis(3,5-dimethyl-4-aminophenyl)-4-methylcyclohexane, 4,4'-(9-fluorenylidene)dianiline ("BAPF"), 2,2'-bis(trifluoromethyl)benzidine ("TFDB"), 4,4'-diaminodiphenyl sulfone ("DADPS)", bis(4-(4-aminophenoxy)phenyl)sulfone ("BAPS"), 2,2',5,5'-tetrachlorobenzidine, 2,7-diaminofluorene, 4,4'-methylene bis(2-methylcyclohexylamine), 4,4-diaminooctafluorobiphenyl, 3,3'-dihydroxybenzidine, 1,3-cyclohexanediamine, or a combination thereof; and dicarboxylic acid dichloride including terephthaloyl chloride ("TPCl"), isophthaloyl chloride ("IPCl"), biphenyl dicarbonyl chloride ("BPCl"), naphthalene dicarbonyl chloride, terphenyl dicarbonyl chloride, 2-fluoro-terephthaloyl chloride or a combination thereof, in the aprotic polar solvent. Herein, the kind and amount of the diamine and the dicarboxylic acid dichloride may be selected appropriately according to a desired composition of the first segment.

In an embodiment, when the first segment is prepared and an excessive amount of diamine is used rather than the dicarboxylic acid dichloride, an amine group may be present at a terminal end of the first segment.

The second segment is an imide block, and it may be prepared using a general process of first preparing a precursor of the second segment, which is an amic acid block, and then imidizing the precursor of the second segment. For example, the second segment may be prepared by reacting a tetracarboxylic dianhydride as a monomer with a diamine, so as to form an amic acid block, and then imidizing the amic acid block using a process such as a thermal solution imidization process or a chemical imidization process.

The amic acid block that is a precursor of the second segment may be prepared by combining and reacting a tetracarboxylic acid dianhydride including 2,2-bis(3,4-dicarboxyphenyl)hexafluoropropane dianhydride ("6FDA"), 3,3',4,4'-biphenyltetracarboxylic dianhydride ("BPDA"), benzophenone tetracarboxylic dianhydride ("BTDA"), bis(3,4-dicarboxyphenyl)sulfone dianhydride, or a combination thereof; and a diamine including 2,2'-bis(trifluoromethyl)benzidine ("TFDB"), 4,4'-diaminodiphenyl sulfone ("DADPS"), 4,4'-(9-fluorenylidene)dianiline ("BAPF"), bis(4-(4-aminophenoxy)phenyl)sulfone ("BAPS"), 2,2',5,5'-tetrachlorobenzidine, 2,7-diaminofluorene, 1,1-bis(4-aminophenyl)cyclohexane, 4,4'-methylene-bis(2-methylcyclohexylamine), 4,4-diaminooctafluorobiphenyl, 3,3'-dihydroxybenzidine, 1,3-cyclohexanediamine, or a combination thereof. Herein, the kind and amount of the diamine and the tetracarboxylic acid dianhydride may be appropriately selected according to a desired composition of the second segment.

In an embodiment, when the second segment is prepared and an excessive amount of the diamine is used rather than the tetracarboxylic acid dianhydride, an amine group may be made to exist at the terminal end of the second segment.

Subsequently, a poly(amide-amic acid) block copolymer may be prepared by combining (e.g., mixing) and copolymerizing the first segment including an amine group at both terminals and the precursor of the second segment including an amine group at both terminal ends with a dicarboxylic acid dichloride including terephthaloyl chloride ("TPCI"), isophthaloyl chloride ("IPCI"), biphenyl dicarbonyl chloride, naphthalene dicarbonyl chloride, terphenyl dicarbonyl chloride, 2-fluoro-terephthaloyl chloride, or a combination thereof. Subsequently, a poly(amide-imide) block copolymer may be prepared by imidizing the poly(amide-amic acid) block copolymer. Herein, the kinds and amounts of the first segment, the precursor of the second segment, and the dicarboxylic acid dichloride may be appropriately selected and used according to a desired composition of the above-described poly(amide-imide) block copolymer. In an embodiment, the copolymerizing may be performed using a low-temperature solution polymerization method, and the imidization may be performed using a chemical imidization, but this disclosure is not limited thereto.

The inorganic particle may have a refractive index of about 1.0 to about 1.6. When the inorganic particle has a refractive index within the foregoing range, the difference between the refractive index of the polymer element surface and the refractive index of air may be reduced, and the refractive index of the polymer element may be gradually increased from the surface of the polymer element to the inside of the polymer layer. While not wishing to be bound by theory it is believed that the light intensity reflected from the polymer element surface may be effectively decreased, and the light reflected from the inside of the polymer may be effectively prevented or mitigated or reduced, so that the light transmittance of the article including the polymer element may be effectively improved. For example, the inorganic particle may have a refractive index of about 1.1 to about 1.5, specifically, about 1.2 to about 1.5, and more specifically, about 1.3 to about 1.5.

The inorganic particle may include an inorganic compound having an oxide, carbonate, nitrate, or sulfate of a metal. In an embodiment, oxide is preferred. The metal may be sodium, potassium, magnesium, calcium, barium, aluminum, zinc, iron, titanium, tin, tungsten, yttrium, antimony, manganese, gallium, vanadium, niobium, silver, silicon, boron, bismuth, molybdenum, cerium, beryllium, or nickel. In an embodiment, sodium, potassium, or silicon, are preferred. Specifically, the inorganic particle may include silica ($SiO_2$), sodium carbonate ($Na_2CO_3$), sodium nitrate ($NaNO_3$), sodium sulfate, potassium carbonate, potassium nitrate, potassium sulfate ($K_2SO_4$), or a combination thereof, but is not limited thereto.

The inorganic particle may be of any configuration, for example spherical, disc-shaped, or irregular. The inorganic particles may be solid particles, aggregated particles, hollow particles or an aerogel type particles, but is not limited thereto.

The inorganic particle may have an average particle diameter of less than or equal to about 400 nm, for example, about 0.1 nm to about 400 nm. When the inorganic particles have a particle diameter within the foregoing range, the light scattering may be prevented or reduced to improve the optical properties, for example, haze characteristics. For example, the inorganic particle may have an average particle diameter of about 1 nm to about 300 nm, specifically, about 1 nm to about 100 nm, and more specifically, about 1 nm to about 40 nm.

As discussed above, the polymer element may be in the form of a layer, a fiber, or other three-dimensional shape. The article including the polymer element may likewise be a film (which includes a sheet), a fiber, a coating material, or an adhesive material, but is not limited thereto.

The article may be formed from the poly(amide-imide) block copolymer using a dry-wet method, a dry method, or a wet method, but this disclosure is not limited thereto.

When the article is a film manufactured using the dry-wet method, the film is formed by extruding the poly(amide-imide) block copolymer from a spinner on a support such as drum or an endless belt, drying the film, and removing, for example evaporating a solvent out of the film until the film has a self maintenance property. The drying may be performed at about 25° C. to about 220° C. for about 1 hour or less. More specifically the drying may be performed at about 25° C. to about 150° C. for about 1 hour or less. When the surface of the drum and/or the endless belt used for the drying process is flat, a film with a flat surface is formed. The film obtained after the drying process is delaminated from the support, and input to a wet process for demineralization and/or desolventization, and the manufacturing of the film is completed, for example the film is subjected to elongation, drying, and/or heat treatment. The elongation conforms to an elongation ratio, which may range from about 0.8 to about 8 in terms of surface ratio. Herein, the "surface ratio" is defined as a value obtained by dividing the area of a film after elongation by an area of the film before the elongation. A surface ratio of less than or equal to 1 denotes a relaxed state. According to an embodiment, the elongation ratio may range from about 1.3 to about 8. In an embodiment, the elongation may be performed not only in a surface direction but also in a thickness direction.

The heat treatment may be performed at a temperature of about 200° C. to about 500° C., and specifically at about 250° C. to about 400° C. for about a few seconds to a few minutes, specifically about 1 second to about 100 minutes, more specifically about 1 second to about 10 minutes.

Also, the film after elongation and heat treatment may be cooled slowly, particularly at a speed of about 50° C./second or lower.

The film may be formed as a single layer or as multiple layers.

At any point in the foregoing process after the film is dried, the film may be treated to provide inorganic particles having a concentration gradient which decreases in concentration from at least one surface of the polymer film to the inside thereof as described in further detail below. For example, the film may be treated directly after drying, after delaminating from the support, after being input to a wet process for demineralization and/or desolventization, after elongation, or after heat treatment.

An article including the polymer element and the inorganic particles having a concentration gradient, in particular wherein the polymer is the poly(amide-imide) block copolymer, may have average light transmittance of greater than or equal to about 80% at a wavelength range of about 380 nm to about 780 nm, and may have a light transmittance of greater than or equal to about 80% at a wavelength of about 400 nm. When the light transmittance of the article including the poly(amide-imide) block copolymer is within the foregoing range, the article including the poly(amide-imide) block copolymer may have excellent or improved color reproducibility. In an embodiment, the article including the poly(amide-imide) block copolymer may have average light transmittance of about 85% to about 95% at a wavelength range of about 380 nm to about 780 nm, and may have light transmittance of about 80% to about 95% at a wavelength of about 400 nm. In another embodiment, the article including the poly(amide-imide) block copolymer may have average light transmittance of about 85% to about 93% in a wavelength range of about 380 nm to about 780 nm, and may have light transmittance of about 80% to about 90% at a wavelength of about 400 nm.

The article including the polymer element and the inorganic particles having a concentration gradient, in particular wherein the polymer is the poly(amide-imide) block copolymer, may have a coefficient of thermal expansion ("CTE") of less than or equal to about 35 per million per ° C. (ppm/° C.). When the coefficient of thermal expansion of the article is within the foregoing range, the article may have excellent or improved heat resistance. In an embodiment, the article may have a coefficient of thermal expansion of less than or equal to about 25 ppm/° C., and specifically less than or equal to about 15 ppm/° C.

The article including the polymer element and the inorganic particles having a concentration gradient, in particular wherein the polymer is the poly(amide-imide) block copolymer may have haze of less than or equal to about 7%. When the haze of the article is within the foregoing range, the article may be transparent enough to have excellent or improved clarity. In an embodiment, the article may have haze of less than or equal to about 5%, specifically of less than or equal to about 3%, and more specifically of less than or equal to about 1.5%.

The article including the poly(amide-imide) block copolymer may have a yellow index ("YI") of less than or equal to 5. When the yellow index ("YI") of the article is within the foregoing range, the article may be transparent and colorless. In an embodiment, the article may have a yellow index ("YI") of about less than or equal to 3, and specifically about 0.3 to about 3.

The article including the polymer element and the inorganic particles having a concentration gradient, in particular wherein the polymer is the poly(amide-imide) block copolymer, may be used for diverse applications, such as a substrate for a device, a substrate for a display device, an optical film, an integrated circuit (IC) package, an adhesive film, a multilayer flexible printed circuit ("FRC"), a tape, a touch panel, or a protective film for an optical disk, due to excellent or improved transparency, heat resistance, mechanical strength, and flexibility.

The method of manufacturing an article including the polymer element and the inorganic particles having a concentration gradient, will now be described in more detail. The method includes: providing a polymer element, for example a layer, including a polymer; contacting at least one surface of the polymer element with inorganic particles, an inorganic particle precursor, or a combination thereof, and a solvent that dissolves the polymer for a time effective for the inorganic particles to form a concentration gradient into the polymer element, and removing the solvent from the contacted polymer element, for example by drying the contacted polymer element to provide the polymer element with inorganic particles having a concentration gradient into the polymer element. The inorganic particles have a concentration gradient which decreases in concentration from at least one surface of the polymer element to the inside thereof, and a refractive index of the inorganic particle is greater than or equal to the refractive index of air and less than the refractive index of the polymer.

The contacting may be in any order, for example the inorganic particle precursor, inorganic particles, or a combination thereof and the solvent may be combined and used to contact the polymer element, the polymer element may first be contacted with the inorganic particle precursor, the inorganic particles, or a combination thereof, and the solvent may be added thereto to form the solution, or the solvent may be combined with the polymer element prior to addition of the inorganic particle precursor, the inorganic particles, or a combination thereof. Unless mentioned otherwise, the article, the polymer, the polymer element, and the inorganic particle are the same as described above.

The inorganic particle precursor may include a colloidal silica, a tetraethoxy silane, a tetramethoxy silane, or the like.

The solvent that dissolves the polymer may include acetone, an alcohol including methanol, and ethanol, an ether including tetrahydrofuran ("THF") and diethyl ether, a pyrrolidone-containing solvent such as N-methyl-2-pyrrolidone, N-acetyl-2-pyrrolidone, and N-vinyl-2-pyrrolidone, an acetamide-containing solvent such as N,N-dimethylacetamide ("DMAc"), N,N-dimethylmethoxyacetamide, and N,N-diethylacetamide, a formamide-containing solvent such as dimethyl formamide ("DMF"), and N,N-diethylformamide, a sulfoxide-containing solvent such as dimethyl sulfoxide (DMSO) and diethylsulfoxide, ethyl acetate, water, or a combination thereof, but is not limited thereto. When the solvent is used, the polymer included in the polymer element is dissolved and may swell the polymer element, so the inorganic particles and/or the inorganic particle precursor are easily permeated into the dissolved polymer. While not wishing to be bound by theory, it is believed, the inorganic particles and/or the inorganic particle precursor may be thus have a concentration gradient which gradually decreases in concentration from at least one surface of the polymer element into the inside thereof.

In an embodiment, a catalyst may be present when an inorganic particle precursor is used, being contacted with the polymer element before, during or after contacting with the inorganic particle precursor. For example, the catalyst may be added to the solvent that dissolves the polymer in order to easily convert an inorganic particle precursor into the inorganic particles. After contacting the polymer element with the catalyst and the inorganic particle precursor for a length of time effective to form the concentration gradient, the solvent is removed as described above.

The catalyst may be selected from an acid including acetic acid, and hydrochloric acid, a base including ammonium hydroxide, or a combination thereof, but is not limited thereto.

The contacting the solution with at least one surface of the polymer element and the contacting the solution including the catalyst with at least one surface of the polymer element, may be performed by a wet coating method. For example, the contacting the solution with at least one surface of the polymer element and the contacting the solution including the catalyst with at least one surface of the polymer element may be performed using bar coating, dip coating, slot die coating, spin coating, roll coating, or a combination thereof, but is not limited thereto.

The contacting is for a length of time effective to form the particle gradient, for example 1 second to 24 hours or more, specifically 30 seconds to 12 hours, or 1 minute to 2 hours. In an embodiment the contacting is carried out for the length of time used to remove the solvent, for example by drying.

The drying may be performed at a temperature of about 20° C. to about 150° C. When the drying is performed within the foregoing temperature range, the solvent may be effectively removed, and the inorganic particle precursor if used may be effectively converted into the inorganic particle. For example, the drying may be performed at a temperature of about 30° C. to about 120° C. The drying may occur over an effective length of time, for example 5 minutes to 24 hours or more, specifically 10 minutes to 12 hours, or 15 minutes to 4 hours.

Another embodiment provides a display device including the article. The display device may include a liquid crystal display ("LCD"), an organic light emitting diode ("OLED"), and the like, but is not limited thereto.

Figure 2:
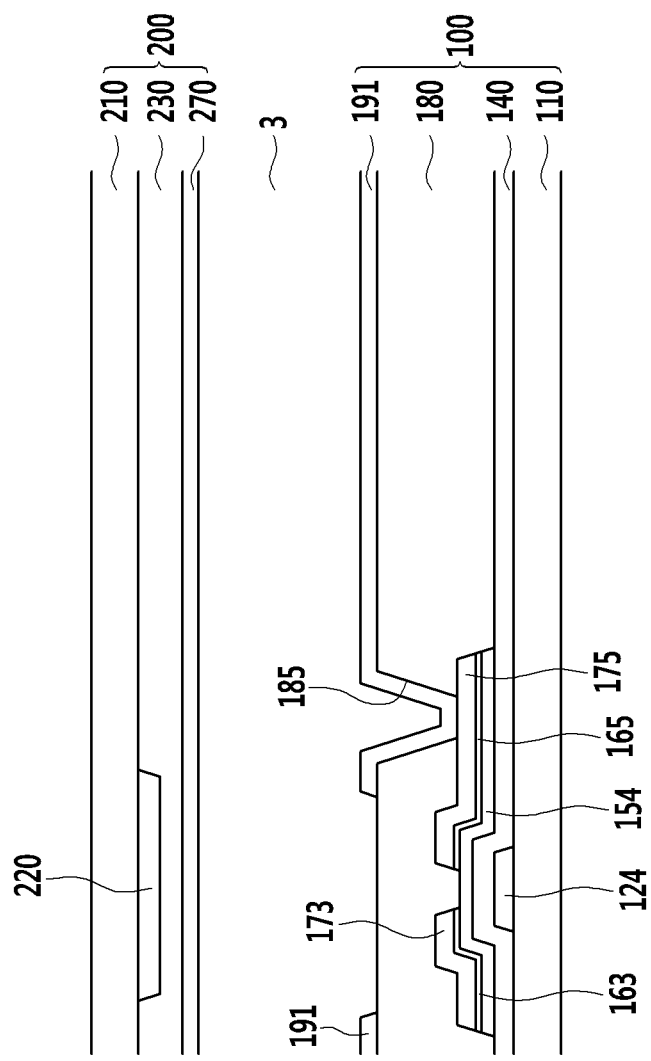
FIG. 2 is a cross-sectional view of a liquid crystal display ("LCD") in accordance with an embodiment.

Among the display devices, a liquid crystal display ("LCD") is described by referring to FIG. 2. FIG. 2 is a cross-sectional view of a liquid crystal display (LCD) in accordance with an embodiment.

Referring to FIG. 2, the liquid crystal display ("LCD") includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173, and a drain electrode 175 are sequentially disposed on a substrate 110. The source electrode 173 and the drain electrode 175 are isolated from each other and they face each other with the gate electrode 124 between them.

A first gate electrode 124, a first source electrode 173, and a first drain electrode 175 constitute one thin film transistor ("TFT") together with the semiconductor 154, and a channel of the thin film transistor is formed in the semiconductor 154 disposed between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as indium tin oxide ("ITO") or indium zinc oxide ("IZO") is disposed on the protective layer 180. The pixel electrode 191 is connected to the drain electrode 175 through the contact hole 185.

The common electrode panel 200 will now be described.

The common electrode panel 200 includes a light blocking member 220 referred to as a black matrix disposed on a substrate 210, a color filter 230 disposed on the substrate 210 and the light blocking member 220, and a common electrode 270 formed on the color filter 230.

Herein, the substrates 110 and 210 may comprise the polymer element and the inorganic particles in a concentration gradient.

Figure 3:
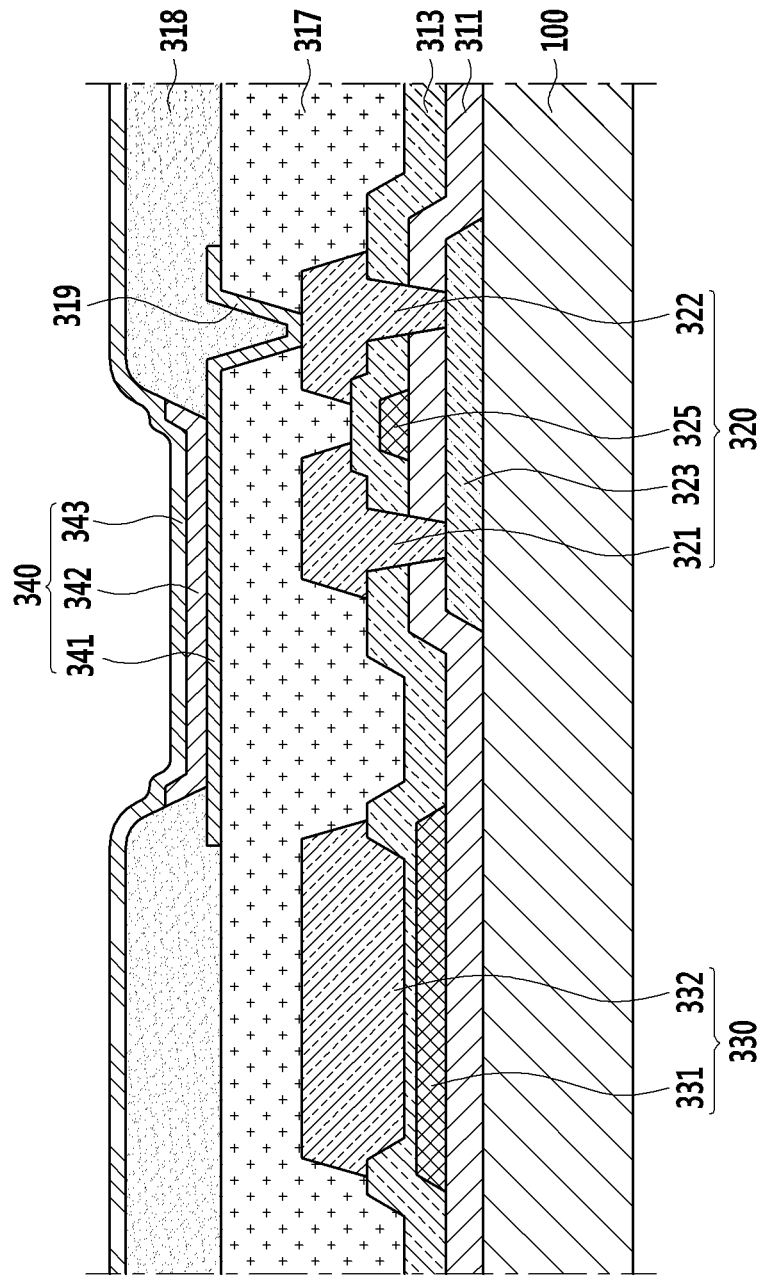
FIG. 3 is a cross-sectional view of an organic light emitting diode ("OLED") device in accordance with an embodiment.

In an embodiment, among the display devices, an organic light emitting diode ("OLED") is described by referring to FIG. 3. FIG. 3 is a cross-sectional view of an organic light emitting diode ("OLED") in accordance with an embodiment.

Referring to FIG. 3, a thin film transistor 320, a capacitor 330, and an organic light emitting diode 340 are formed on a substrate 100. The thin film transistor 320 includes a source electrode 321, a semiconductor layer 323, a gate electrode 325, and a drain electrode 322, and the capacitor 330 includes a first capacitor layer 331 and a second capacitor layer 332. The organic light emitting diode 340 includes a pixel electrode 341, an intermediate layer 342, and an opposed electrode 343.

According to an embodiment, the semiconductor layer 323, a gate insulating layer 311, the first capacitor layer 331, the gate electrode 325, an interlayer insulating layer 313, the second capacitor layer 332, the source electrode 321, and the drain electrode 322 are formed on the substrate 300. The source electrode 321 and the drain electrode 322 are isolated from each other, and they face each other with the gate electrode 325 disposed between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341, formed of a transparent conductive material such as ITO or IZO, is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is disposed in a portion where the pixel electrode 341, the intermediate layer 342, and the opposed electrode 343 are not disposed on the planarization layer 317.

Herein, the substrate 300 may comprise the polymer element and the inorganic particles in a concentration gradient.

Hereafter, the embodiments of this disclosure are described in detail with reference to examples and comparative examples. The following examples and comparative examples are not restrictive, but are for illustrative purposes only and are not intended to limit the scope of the one or more embodiments.

Preparation of Polymer Layer

Preparation Example 1

First Step: Preparation of First Segment 4.1705 grams (g) (0.0168 moles (mol)) of 4,4'-diaminodiphenyl sulfone ("DADPS") and 0.7686 g (0.0024 mol) of 2,2'-bis(trifluoromethyl)benzidine ("TFDB") are introduced into a 250 milliliter (ml) 4-neck double-walled reactor having a mechanical agitator and a nitrogen injection hole, and 42 ml of N,N-dimethyl acetamide ("DMAc") is added thereto to provide a diamine solution.

The diamine solution is agitated until the monomers are completely dissolved, and then cooled to a temperature of 5° C. under a nitrogen atmosphere.

Then 1.9491 g (0.0096 mol) of terephthaloyl chloride ("TPCl") is added over a period of 30 minutes in 4 steps. The temperature of the reactor is increased to 10° C.

The resultant mixture is reacted while agitating it for one hour to obtain a first segment. The obtained first segment has a weight average molecular weight of 15,700 grams per mole (g/mol).

Second Step: Preparation of Precursor of Second Segment 25.6 g (0.08 mol) of 2,2'-bis(trifluoromethyl)benzidine ("TFDB") is introduced into a 250 ml 4-neck double-walled reactor having a mechanical agitator and a nitrogen injection hole, and then 90 ml of N,N-dimethyl acetamide ("DMAc") is added thereto and dissolved at a temperature of 20° C. under a nitrogen atmosphere.

Then, 26.65 g (0.06 mol) of 2,2-bis(3,4-dicarboxyphenyl) hexafluoropropane dianhydride ("6FDA") and 14.5 g of dimethyl acetamide ("DMAc") are added thereto and reacted at a temperature of 20° C. for 48 hours to obtain a second segment precursor solution. The obtained second segment precursor has a weight average molecular weight of 13,700 g/mol.

Third Step: Preparation of Polymer (Poly(Amide-Imide) Block Copolymer) and Polymer Layer The obtained first segment is added into the obtained second segment precursor solution. The reactor temperature is maintained at 5° C.

2.2739 g (0.0112 mol) of terephthaloyl chloride ("TPCl") is added thereto in 4 steps. The reactor is heated to about 10° C. and reacted while agitating for one hour.

The temperature of the reactor is increased to 20° C. and 1.2 ml (0.0128 mol) of acetic anhydride is added thereto and agitated for 30 minutes.

Then 5.5 ml (0.0672 mol) of pyridine is added thereto and reacted for 21 hours to provide a poly(amide-imide) block copolymer solution.

The obtained poly(amide-imide) block copolymer solution is poured into distilled water and is precipitated. The obtained precipitate is ground twice using a blender and washed with ethanol and then filtered.

The filtered product is placed in a vacuum oven and dried at a temperature of 80° C. overnight to provide a poly(amide-imide) block copolymer.

The poly(amide-imide) block copolymer is coated on a glass substrate and dried at 65° C., 70° C., and 75° C. each for 20 minutes, and dried at 80° C. and 130° C. each for 30 minutes to provide a polymer layer. The polymer layer has a thickness of 50 µm.

Preparation of Film

Example 1

A colloid silica solution (Oscal 1132, Catalysts & Chemicals Ind. Co., Ltd) in which silica having a particle diameter of 12 nm, is dispersed in methanol at 10 wt %.

Using a bar coater (ZEHNTNER GmbH, ZAA 2300), the colloid silica solution is coated on one surface of the polymer layer obtained from Preparation Example 1 and dried at 120° C. for 0.5 hours to provide a film including silica particles having a concentration gradient.

Example 2

A film is fabricated in accordance with the same procedure as in Example 1, except that the colloid silica solution is coated on both surfaces of the polymer layer obtained from Preparation Example 1.

Example 3

Tetraethoxy silane ("TEOS"), water, ethanol, and ammonia are mixed in a mole ratio of 1:3.25:37.6:0.17 at room temperature (about 25° C.) for 2 hours to provide a silica solution.

Using a bar coater (ZEHNTNER co, ZAA 2300), the colloid silica solution is coated on one surface of the polymer layer obtained from Preparation Example 1 and dried at 120° C. for 0.5 hours to provide a film including silica particles having a concentration gradient.

Example 4

Oscal 1132 (colloidal silica having a particle diameter of 12 nm dispersed in methanol, solid content of 30 wt %) and N,N-dimethylacetamide ("DMAc") are mixed at 1:1 to provide a colloid silica solution.

Using a bar coater (ZEHNTNER co, ZAA 2300), the colloid silica solution is coated on one surface of the polymer layer obtained from Preparation Example 1 and dried at 120° C. for 0.5 hours to provide a film in which silica particles are present in a concentration gradient.

Example 5

A film is fabricated in accordance with the same procedure as in Example 4, except that the colloid silica solution is coated on both surfaces of the polymer layer obtained from Preparation Example 1.

Example 6

A colloid silica solution (Oscal 1132, Catalysts & Chemicals Ind. Co., Ltd) including silica having a particle diameter of 12 nm is dispersed in methanol at 30 wt %.

The polymer layer obtained from Preparation Example 1 is immersed in the colloid silica solution and maintained at 80° C. for 15 minutes to swell the polymer layer, so that the silica is permeated through the polymer of the polymer layer.

The swelled polymer layer is then taken out and washed with ethanol.

The polymer layer is dried at 120° C. for 30 minutes to provide a film in which the silica particle is present in a concentration gradient.

Example 7

Tetraethoxy silane ("TEOS"), water, ethanol, and ammonia are mixed at a mole ratio of 1:3.25:37.6:0.17 at room temperature (about 25° C.) for 2 hours to provide a silica solution.

The polymer layer obtained from Preparation Example 1 is immersed in the silica solution and maintained at 80° C. for 15 minutes to swell the polymer layer, so that the silica is permeated through the polymer of the polymer layer.

Then the swelled polymer layer is taken out and washed with ethanol.

The polymer layer is dried at 120° C. for 30 minutes to provide a film in which the silica particles are present in a concentration gradient.

Example 8

Oscal 1132 (colloidal silica having a particle diameter of 12 nm dispersed in methanol, solid content of 30 wt %) and N,N-dimethylacetamide ("DMAc") are mixed at 1:1 to provide a colloid silica solution.

The polymer layer obtained from Preparation Example 1 is immersed in the colloid silica solution and maintained at 80° C. for 15 minutes to swell the polymer layer, so that the silica is permeated through the polymer of the polymer layer.

Then the swelled polymer layer is taken out and washed with ethanol.

The polymer layer is dried at 120° C. for 30 minutes to provide a film in which the silica particles are present in a concentration gradient.

Example 9

Tetraethoxy silane ("TMOS") is added to acetone at 30 wt % and mixed to provide a solution.

The polymer layer obtained from Preparation Example 1 is immersed in the solution and maintained at 80° C. for 15 minutes to swell the polymer layer, so that the tetraethoxy silane is permeated through the polymer of the polymer layer.

The swelled polymer layer is then taken out and cleaned with 0.1 mol of a $NH_3$ aqueous solution, and then the tetraethoxy silane is hydrolyzed, silica particles are formed, and acetone is removed.

The polymer layer is dried at 120° C. for 15 minutes to provide a film in which the silica particles are present in a concentration gradient.

Example 10

Tetramethoxy silane ("TMOS") is added to acetone at 30 wt % and mixed to provide a solution.

The polymer layer obtained from Preparation Example 1 is immersed in the solution and maintained at 80° C. for 15 minutes to swell the polymer layer, so that the tetramethoxy silane is permeated through the polymer of the polymer layer.

Then the swelled polymer layer is taken out and cleaned with 0.1 mol of an $NH_3$ aqueous solution, and then the tetramethoxy silane is hydrolyzed, silica particles are formed, and acetone is removed.

The polymer layer is dried at 80° C. for 10 minutes to provide a film in which the silica particles are present in a concentration gradient.

Example 11

A film is fabricated in accordance with the same procedure as in Example 10, except that it is dried at room temperature (about 25° C.) for 10 minutes.

Example 12

Tetramethoxy silane ("TMOS") is added to methanol at 30 wt % and mixed to provide a solution.

The polymer layer obtained from Preparation Example 1 is immersed in the solution and maintained at 80° C. for 15 minutes to swell the polymer layer, so that the tetramethoxy silane is permeated through the polymer of the polymer layer.

The swelled polymer layer is then taken out and cleaned with 0.1 mol of a $NH_3$ aqueous solution, and then the tetramethoxy silane is hydrolyzed, silica particles are formed, and methanol is removed.

The polymer layer is dried at room temperature (about 25° C.) for 10 minutes to provide a film in which the silica particles are present in a concentration gradient.

Example 13

Tetramethoxy silane ("TMOS") is added to acetone at 30 wt % and mixed to provide a solution.

The polymer layer obtained from Preparation Example 1 is immersed in the solution and maintained at 80° C. for 15 minutes to swell the polymer layer, so that the tetramethoxy silane is permeated through the polymer of the polymer layer.

The swelled polymer layer is taken out and cleaned with 0.1 M of a $NH_3$ aqueous solution, and then the tetramethoxy silane is hydrolyzed, silica particles are formed, and acetone is removed.

The polymer layer is dried at 80° C. for 16 hours to provide a film in which the silica particles are present in a concentration gradient.

Example 14

Tetramethoxy silane ("TMOS") is added to methanol at 30 wt % and mixed to provide a solution.

The polymer layer obtained from Preparation Example 1 is immersed in the solution and maintained at 80° C. for 15 minutes to swell the polymer layer, so that the tetramethoxy silane is permeated through the polymer of the polymer layer.

The swelled polymer layer is taken out and cleaned with 0.1 mol of a $NH_3$ aqueous solution, and then the tetramethoxy silane is hydrolyzed, silica particles are formed, and methanol is removed.

The polymer layer is dried at room temperature (about 25° C.) for 16 hours to provide a film in which the silica particles are present in a concentration gradient.

Comparative Example 1

The polymer layer obtained from Preparation Example 1 is used as a film.

Experimental Example 1

X-Ray Photoelectron Spectroscopy ("XPS") Analysis

The films obtained from Examples 1 to 14 undergo analysis with XPS (X-ray photoelectron spectroscopy) using X-ray photoelectron spectroscopy analysis equipment Quantum 2000 Micro-X (manufactured by Ulvac PHI) to analyze the element distribution according to depth from the film surface.

Figure 4:
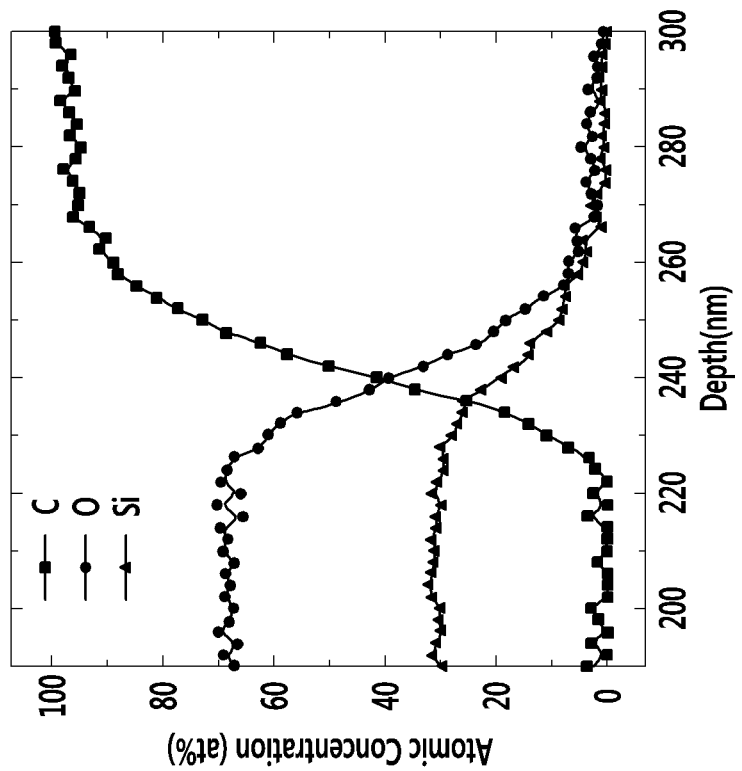
FIG. 4 is a graph illustrating depth (nanometers) versus atomic concentration, according to an embodiment.

FIG. 4 is an XPS analysis graph of Example 1.

As shown in FIG. 4, it is confirmed that the film obtained from Example 1 includes the silica particles having a concentration gradient which gradually decreases in concentration to a depth of about 260 nm from the surface.

Experimental Example 2

Evaluation of Optical Properties

In order to evaluate the optical properties of films obtained in Examples 1 to 14 and Comparative Example 1, the light transmittance, the haze, and the yellow index ("YI") are measured with a KONICA MINOLTA spectrophotometer, and the results are shown in the following Table 1.

Figure 5:
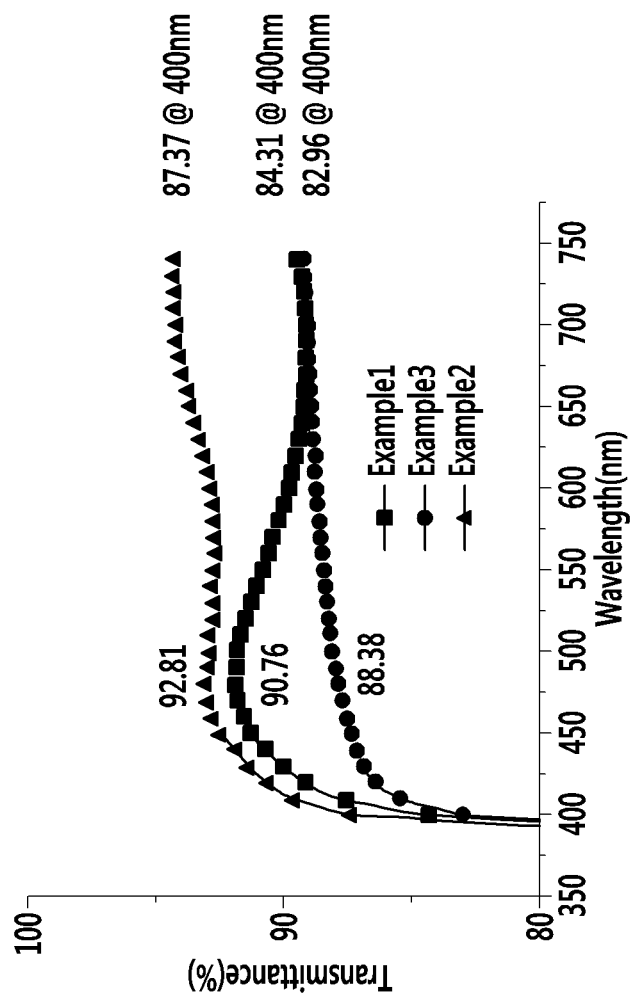
FIG. 5 is a light transmittance graph illustrating wavelength (nanometers) versus transmittance (percent) of films obtained from Examples 1 to 3.
Figure 6:
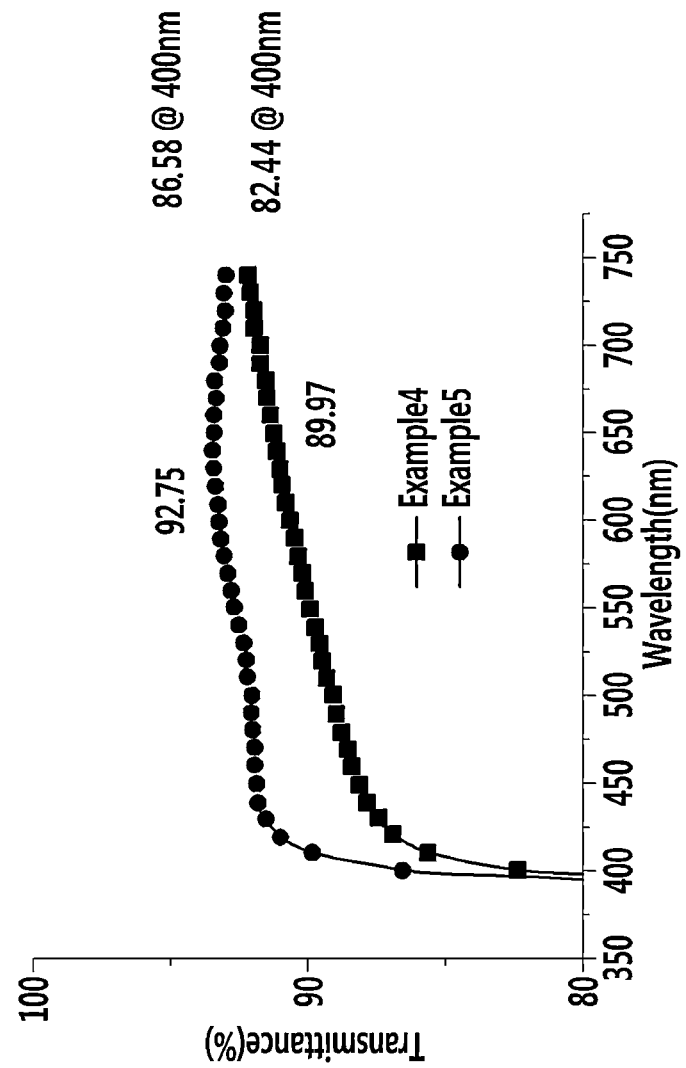
FIG. 6 is a light transmittance graph illustrating wavelength (nanometers) versus transmittance (percent) of films obtained from Examples 4 and 5.
Figure 7:
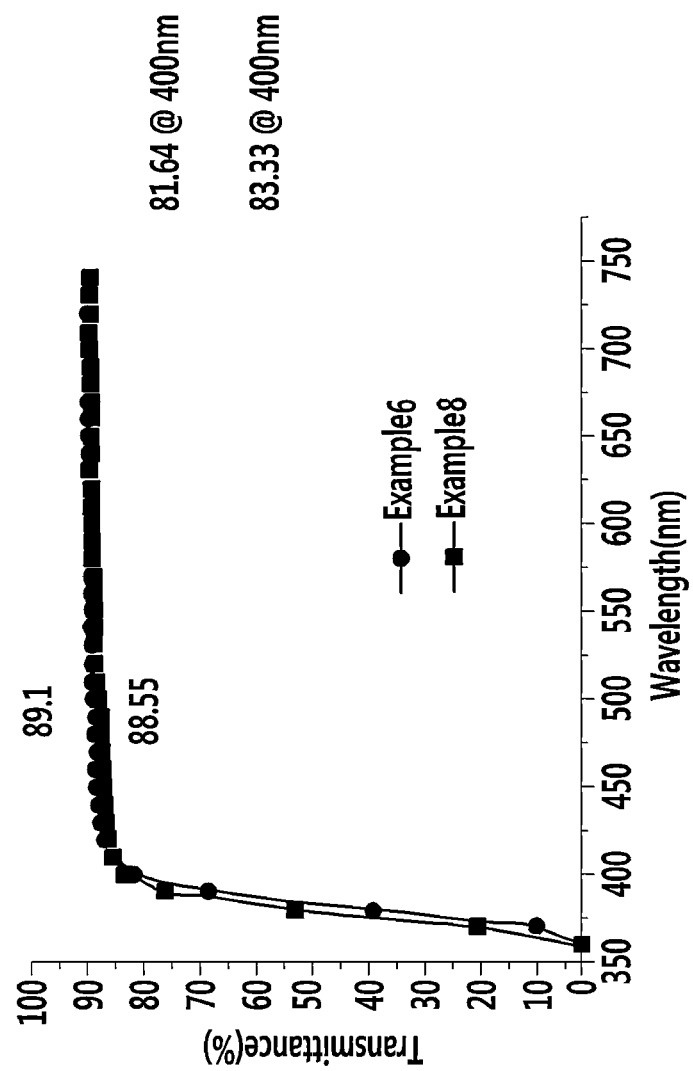
FIG. 7 is a light transmittance graph illustrating wavelength (nanometers) versus transmittance (percent) of films obtained from Examples 6 and 8.
Figure 8:
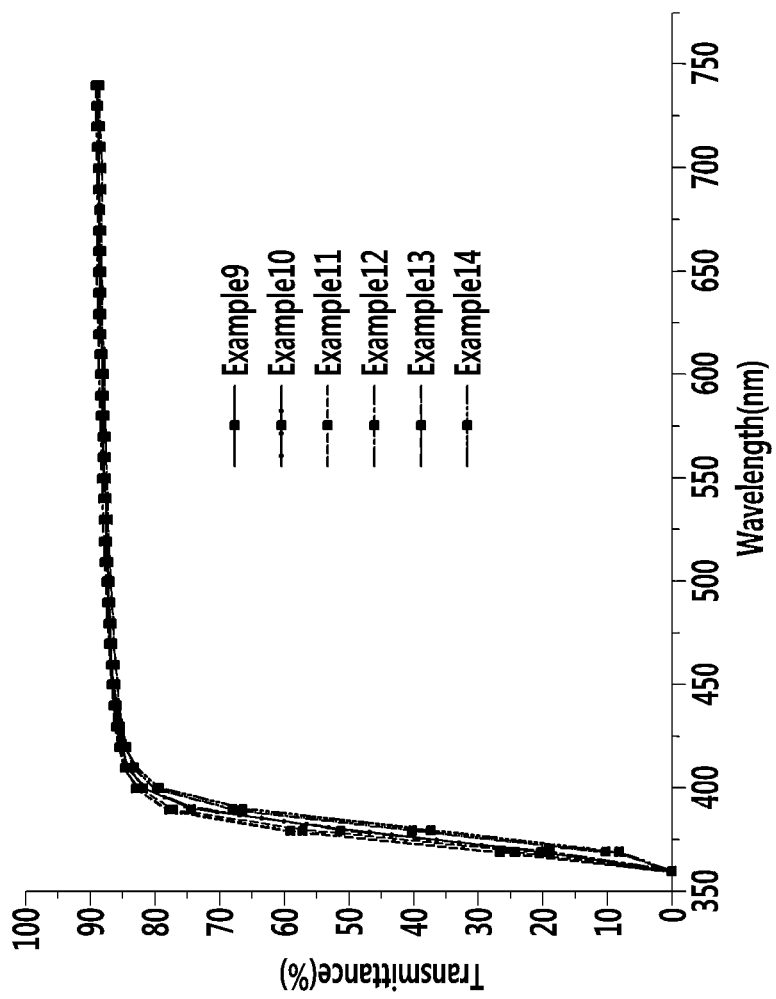
FIG. 8 is a light transmittance graph illustrating wavelength (nanometers) versus transmittance (percent) of films obtained from Examples 9 to 14.
Figure 9:
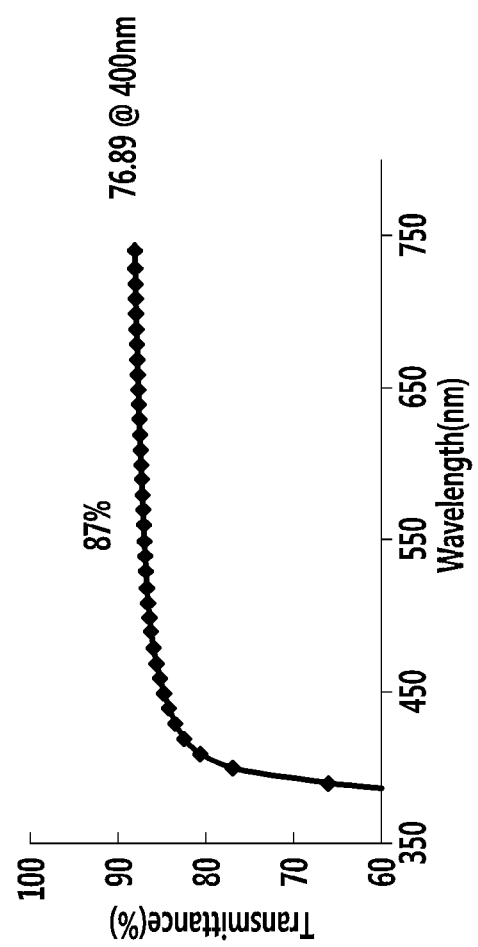
FIG. 9 is a light transmittance graph illustrating wavelength (nanometers) versus transmittance (percent) of the film obtained from Comparative Example 1.

In addition, light transmittance graphs showing light transmittance are shown in FIG. 5 to FIG. 9, respectively. Specifically, FIG. 5 is a light transmittance graph of the films obtained from Examples 1 to 3; FIG. 6 is a light transmittance graph of the films obtained from Examples 4 and 5; FIG. 7 is a light transmittance graph of the films obtained from Examples 6 and 8; FIG. 8 is a light transmittance graph of the films obtained from Examples 9 to 14; and FIG. 9 is a light transmittance graph of the film obtained from Comparative Example 1.

TABLE 1

| | Average light transmittance (%, 380 nm to 780 nm) | Light transmittance (%, 400 nm) | Haze (%) | Yellow index |
|---|---|---|---|---|
| Example 1 | 90.76 | 84.31 | 0.31 | −0.48 |
| Example 2 | 92.81 | 87.37 | 3.01 | 0.43 |
| Example 3 | 88.38 | 82.96 | 0.25 | 1.1 |
| Example 4 | 89.97 | 82.44 | 0.87 | 1.96 |
| Example 5 | 92.75 | 86.58 | 1.73 | 0.92 |
| Example 6 | 89.1 | 81.64 | 6.59 | 1.1 |
| Example 7 | 87.8 | 81.95 | 0.63 | 1.01 |
| Example 8 | 88.55 | 83.33 | 0.65 | 1.27 |
| Example 9 | 87.7 | 81.92 | 0.54 | 1.39 |
| Example 10 | 87.75 | 82.89 | 0.36 | 1.39 |
| Example 11 | 88.03 | 82.25 | 0.69 | 1.49 |
| Example 12 | 87.81 | 82.8 | 0.43 | 1.38 |
| Example 13 | 87.53 | 80.66 | 0.58 | 1.82 |
| Example 14 | 87.77 | 80.33 | 0.38 | 1.66 |
| Comparative Example 1 | 87 | 76.89 | 0.65 | 1.1 |

As shown in Table 1 and FIG. 5 to FIG. 9, it is confirmed that the films obtained from Examples 1 to 14 have average light transmittance of greater than or equal to about 87.53% at a wavelength range of about 380 nm to about 780 nm; light transmittance of greater than or equal to about 80% at a wavelength of about 400 nm; haze of less than or equal to 6.59%; and a yellow index of less than or equal to 1.96, which are excellent optical properties.

In contrast, the film obtained from Comparative Example 1 has comparable haze and yellow index to those of Examples 1 to 14, but has inferior average light transmittance at a wavelength range of about 380 nm to about 780 nm and inferior light transmittance at a wavelength of about 400 nm to those of Examples 1 to 14.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An article, comprising:
   a polymer element comprising a polymer; and
   inorganic particles having a concentration gradient which decreases in concentration from at least one surface of the polymer element to the inside thereof,
   wherein the inorganic particles have a refractive index that is greater than or equal to the refractive index of air and less than the refractive index of the polymer, the polymer is a poly(amide-imide) block copolymer and wherein the concentration gradient of the inorganic particles is within a depth of about 3 micrometer from the surface of the polymer element.

2. The article of claim 1, wherein the inorganic particles have a continuous concentration gradient.

3. The article of claim 1, wherein the polymer element has a thickness of about 1 micrometer to about 1000 micrometer.

4. The article of claim 1, wherein the polymer has a refractive index of about 1.5 to about 1.8.

5. The article of claim 1, wherein the polymer includes a first segment including a repeating unit represented by the following Chemical Formula 1, a repeating unit represented by the following Chemical Formula 2, or a combination thereof; and a second segment including a repeating unit represented by the following Chemical Formula 3:

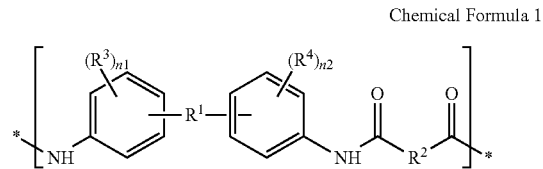

Chemical Formula 1 wherein, in Chemical Formula 1, $R^1$ is the same or different in each repeating unit, and each is independently —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, a substituted or unsubstituted C5 to C30 alicyclic group fused to each phenyl ring to provide a condensed cyclic group, a substituted or unsubstituted C3 to C30 alicyclic group, a substituted or unsubstituted C2 to C30 heterocyclic group, a substituted or unsubstituted C13 to C20 fluorenylene group, or a substituted or unsubstituted C6 to C30 aromatic group, wherein the alicyclic group, the heterocyclic group, or the aromatic group is present singularly; at least two of the alicyclic groups, the heterocyclic groups, or the aromatic groups are linked to provide a condensed cyclic group; or at least two of the alicyclic groups, the heterocyclic groups, or the aromatic groups are linked via a single bond, a substituted or unsubstituted C13 to C20 fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^2$ is the same or different in each repeating unit, and each is independently a substituted or unsubstituted C6 to C30 aromatic group, $R^3$ and $R^4$ are the same or different in each repeating unit and are each independently hydrogen, a halogen, a hydroxy group, an alkoxy group ($-OR^{200}$, wherein $R^{200}$ is a C1 to C10 aliphatic group), a silyl group ($-SiR^{201}R^{202}R^{203}$, wherein $R^{201}$, $R^{202}$, and $R^{203}$ are the same or different and are each independently hydrogen or a C1 to C10 aliphatic group), a substituted or unsubstituted C1 to C10 aliphatic group, or a C6 to C20 aromatic group, and n1 and n2 are the same or different in each repeating unit and are each independently integers ranging from 0 to 4, Chemical Formula 2

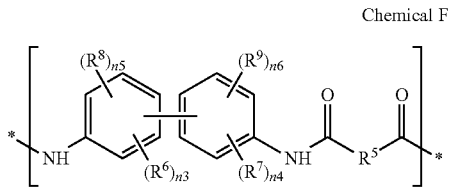

wherein, in Chemical Formula 2, $R^5$ is the same or different in each repeating unit, and each is independently a substituted or unsubstituted C6 to C30 aromatic group, $R^6$ and $R^7$ are the same or different in each repeating unit, and are each independently an electron withdrawing group, $R^8$ and $R^9$ are the same or different in each repeating unit, and are each independently hydrogen, a halogen, a hydroxy group, an alkoxy group ($-OR^{204}$, wherein $R^{204}$ is a C1 to C10 aliphatic group), a silyl group ($-SiR^{205}R^{206}R^{207}$, wherein $R^{205}$, $R^{206}$, and $R^{207}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted a C6 to C20 aromatic group, n3 is the same or different in each repeating unit and is an integer ranging from 1 to 4, n5 is the same or different in each repeating unit and is an integer ranging from 0 to 4, and a sum of n3 and n5 is an integer ranging from 1 to 4, and n4 is the same or different in each repeating unit and is an integer ranging from 1 to 4, n6 is the same or different in each repeating unit and is an integer ranging from 0 to 4, and a sum of n4 and n6 is an integer ranging from 1 to 4, Chemical Formula 3

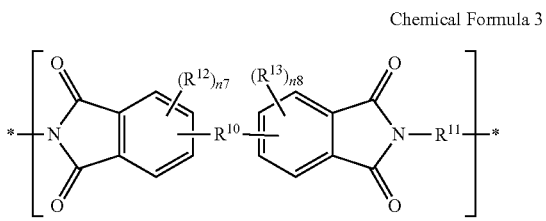

wherein, in Chemical Formula 3, $R^{10}$ is the same or different in each repeating unit, and each is independently a single bond, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, $-O-$, $-S-$, $-S(=O)_2-$, or $-C(=O)-$, $R^{11}$ is the same or different in each repeating unit, and each independently is a substituted or unsubstituted C6 to C30 aromatic group, or a substituted or unsubstituted C3 to C30 alicyclic group, wherein the alicyclic group or the aromatic group is present singularly; at least two of the alicyclic groups or the aromatic groups are linked to provide a condensed cyclic group; or at least two of the alicyclic groups or the aromatic groups are linked via a single bond, a substituted or unsubstituted C13 to C20 fluorenylene group, a substituted or unsubstituted C3 to C30 alicyclic group, $-O-$, $-S-$, $-C(=O)-$, $-CH(OH)-$, $-S(=O)_2-$, $-Si(CH_3)_2-$, $-(CH_2)_p-$ (wherein $1 \le p \le 10$), $-(CF_2)_q-$ (wherein $1 \le q \le 0$), $-C(CH_3)_2-$, $-C(CF_3)_2-$, or $-C(=O)NH-$, $R^{12}$ and $R^{13}$ are the same or different in each repeating unit and are each independently hydrogen, a halogen, a hydroxy group, an alkoxy group ($-OR^{208}$, wherein $R^{208}$ is a C1 to C10 aliphatic group), a silyl group ($-SiR^{209}R^{210}R^{211}$, wherein $R^{209}$, $R^{210}$, and $R^{211}$ are the same or different and are each independently hydrogen or a C1 to C10 aliphatic group), a substituted or unsubstituted C1 to C10 aliphatic group, a substituted or unsubstituted C3 to C30 alicyclic group, or a C6 to C20 aromatic group, and n7 and n8 are the same or different in each repeating unit and are each independently an integer ranging from 0 to 3.

6. The article of claim 1, wherein the inorganic particles have a refractive index of about 1.0 to about 1.6.

7. The article of claim 1, wherein the inorganic particles comprises an inorganic compound comprising an oxide, carbonate, nitrate, or sulfate of a metal.

8. The article of claim 7, wherein the metal is sodium, potassium, magnesium, calcium, barium, aluminum, zinc, iron, titanium, tin, tungsten, yttrium, antimony, manganese, gallium, vanadium, niobium, silver, silicon, boron, bismuth, molybdenum, cerium, beryllium, nickel, or a combination thereof.

9. The article of claim 7, wherein the inorganic particles comprises silica ($SiO_2$), sodium carbonate ($Na_2CO_3$), sodium nitrate ($NaNO_3$), sodium sulfate ($Na_2SO_4$, potassium carbonate ($KCO_3$), potassium nitrate ($KNO_3$), potassium sulfate ($K_2SO_4$), or a combination thereof.

10. The article of claim 1, wherein the inorganic particles have a particle diameter of about 0.1 nanometer to about 400 nanometer.

11. The article of claim 1, wherein the article is a film, a fiber, a coating material, or an adhesive.

12. The article of claim 1, wherein the article has an average light transmittance of greater than or equal to about 80% at a wavelength range of about 380 nanometer to about 780 nanometer.

13. The article of claim 1, wherein the article has a light transmittance of greater than or equal to about 80% at a wavelength of about 400 nanometer.

14. A display device comprising the article according to claim 1.

* * * * *